United States Patent
Abe et al.

[11] Patent Number: 6,018,510
[45] Date of Patent: Jan. 25, 2000

[54] PHASE CHANGE RECORDING MEDIUM FOR ALLOWING A TRACKING SERVO CONTROL BASED ON A DIFFERENTIAL PHASE DETECTION TRACKING METHOD

[75] Inventors: Michiharu Abe; Michiaki Shinotsuka; Masahiko Nakayama, all of Kanagawa, Japan

[73] Assignee: Ricoh Company, Ltd., Tokyo, Japan

[21] Appl. No.: 09/056,630

[22] Filed: Apr. 8, 1998

[30]     Foreign Application Priority Data

| Apr. 9, 1997 | [JP] | Japan | 9-105366 |
| May 12, 1997 | [JP] | Japan | 9-120514 |
| May 28, 1997 | [JP] | Japan | 9-138912 |
| Jun. 12, 1997 | [JP] | Japan | 9-154829 |

[51] Int. Cl.$^7$ .......................................... G11B 7/26
[52] U.S. Cl. ................. 369/275.1; 369/13; 369/275.4; 428/64.3
[58] Field of Search ...................... 369/275.4, 275.3, 369/275.1, 275.2, 13, 32, 283; 428/694, 64.8, 900, 64.1, 64.3, 64.4; 430/945, 321; 216/24, 54, 65, 79

[56]          References Cited

U.S. PATENT DOCUMENTS

| 5,060,223 | 10/1991 | Segawa ............................. 369/275.4 |
| 5,144,552 | 9/1992 | Abe ................................... 369/275.4 |
| 5,220,556 | 6/1993 | Shimizu ............................ 369/275.1 |
| 5,316,814 | 5/1994 | Sawada et al. .................... 428/64.8 |
| 5,554,451 | 9/1996 | Taki et al. ....................... 369/275.1 X |
| 5,581,539 | 12/1996 | Horie et al. ........................ 369/275.4 |
| 5,602,823 | 2/1997 | Aoki et al. ......................... 369/275.3 |
| 5,676,854 | 10/1997 | Inui et al. ............................. 216/24 |
| 5,776,574 | 7/1998 | Honguh et al. ................. 369/275.1 X |

FOREIGN PATENT DOCUMENTS

| 0 548 828 | 6/1993 | European Pat. Off. . |
| 0 626 679 | 11/1994 | European Pat. Off. . |
| 0 737 967 | 10/1996 | European Pat. Off. . |
| 0 749 118 | 12/1996 | European Pat. Off. . |
| 0 752 701 | 1/1997 | European Pat. Off. . |
| 0 766 240 | 4/1997 | European Pat. Off. . |
| WO 98/24089 | 6/1998 | European Pat. Off. . |
| 56-30610 | 7/1981 | Japan . |
| 63-57859 | 11/1988 | Japan . |
| 2-56734 | 12/1990 | Japan . |
| 3-18255 | 3/1991 | Japan . |

*Primary Examiner*—Tan Dinh
*Assistant Examiner*—Kim-Kwok Chu
*Attorney, Agent, or Firm*—Oblon, Spivak, McClelland, Maier & Neustadt, P.C.

[57]          ABSTRACT

An erasable phase change recording medium includes a transparent substrate, a recording layer of a phase change material provided on the substrate, and a protection layer provided to protect the recording layer on the substrate. Tracks are formed with alternate grooves and lands on the substrate of the recording medium and data is recorded to at least one of the grooves and the lands. The recording medium is configured to have a track pitch between 0.6 μm and 0.8 μm and a groove depth between 0.11.L and 0.18.L where L is a wavelength of a laser beam.

17 Claims, 14 Drawing Sheets

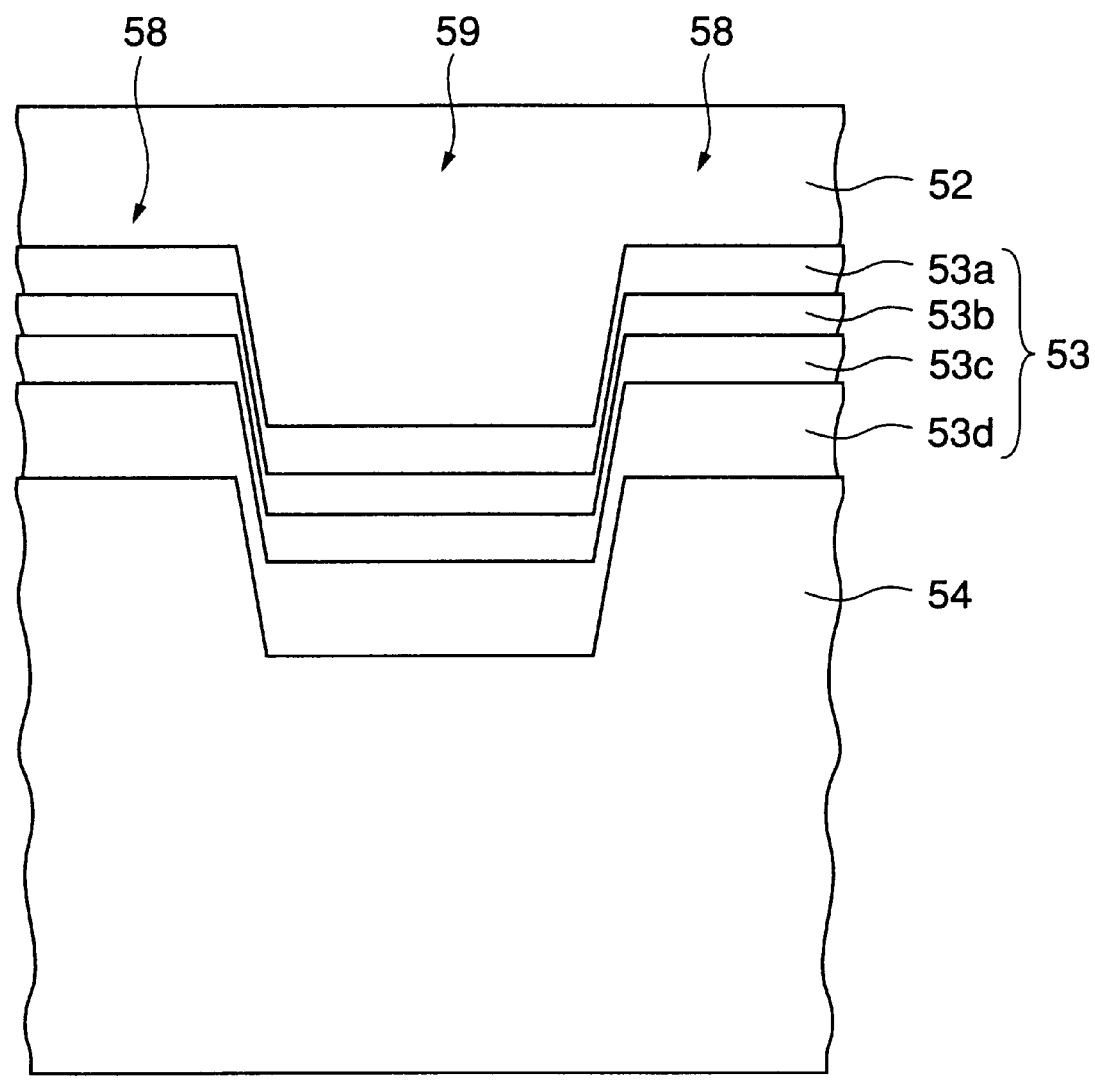

PHASE CHANGE RECORDING MEDIUM FOR ALLOWING A TRACKING SERVO CONTROL BASED ON A DIFFERENTIAL PHASE DETECTION TRACKING METHOD

BACKGROUND OF THE INVENTION (1) Field of the Invention

The present invention generally relates to a phase change recording medium, and more particularly to a phase change recording medium which enables an existing optical disk apparatus, such as a DVD-ROM player, to reproduce data from the phase change recording medium in a manner similar to an existing DVD-ROM (digital video disk read-only memory).

(2) Description of the Related Art

An optical disk apparatus records a data signal, such as a video signal or an audio signal, to an optical disk and reproduces the data signal from the optical disk. In the optical disk, tracks are formed with alternate grooves and lands on a substrate of the optical disk.

In an existing optical disk apparatus, a laser beam from a laser light source is focused on one of the grooves and lands on the optical disk, and data is recorded to or reproduced from one of the grooves and the lands of the optical disk. The other of the grooves and the lands of the optical disk serve as a guard band which separates adjacent tracks from a recording track accessed by the optical disk apparatus. There also exists an optical disk apparatus adapted to record data to or reproduce data from both the grooves and the lands of the optical disk by focusing the laser beam on one of the grooves and the lands of the optical disk.

FIG. 5 shows a configuration of a conventional optical recording medium.

In FIG. 5, reference numeral 1 denotes a recording layer in the conventional optical recording medium, and the recording layer 1 is made of, for example, a phase change material. Reference numeral 3 denotes a light spot placed on the recording layer 1 of the recording medium. The recording layer 1 is provided with grooves 4 and lands 5, and data pits 2 and address pits 6 are provided on the lands 5 of the recording layer 1. The data pits 2 represent data recorded to the recording medium, and the address pits 6 represent positional data on the recording medium. In the conventional optical recording medium of FIG. 5, a transparent substrate of the recording medium is omitted.

FIG. 6 shows a conventional optical disk player/recorder apparatus which accesses an optical disk similar to the optical recording medium of FIG. 5.

In FIG. 6, reference numeral 10 denotes the optical disk, and reference numeral 11 denotes a track on the optical disk 10. The optical disk 10 is rotated by a spindle motor 9. In the conventional optical disk apparatus of FIG. 6, an optical head 18 is provided to access the optical disk 10.

In the optical head 18, a laser diode (LD) 12 is provided as a light source which emits a laser beam to the optical disk 10. A collimator lens 13 converts a laser beam emitted by the laser diode 12 into a parallel beam. A beam splitter 14 is provided in an optical path of the parallel beam from the collimator lens 13. An objective lens 15 converts the parallel beam passing through the beam splitter 14 into a converging beam so that the converging beam forms a light spot on the optical disk 10.

A reflection beam from the optical disk 10 passes through the objective lens 15, and it is reflected by the beam splitter 14 to a photodetector 16. The photodetector 16 is divided into two photodiodes 16a and 16b. The photodiodes 16a and 16b are provided such that both the photodiodes 16a and 16b extend in a direction parallel to a track of the optical disk 10. A tracking error (TE) signal is generated based on signals output from the photodiodes 16a and 16b. An actuator 17 supports the objective lens 15. The above-mentioned elements 12 through 17 are installed on a head base (not shown) of the optical head 18.

In the conventional optical disk apparatus of FIG. 6, a differential amplifier 21 is provided to generate a push-pull signal indicating a difference between the signals output from the photodiodes 16a and 16b. A low pass filter (LPF) 22 is provided to pass through a low-frequency component of the push-pull signal from the differential amplifier 21 and eliminate a high-frequency component of the push-pull signal. A tracking control unit 23 is provided to generate a tracking control signal based on the push-pull signal from the LPF 22 in response to a control signal "L1" from a system controller 30. The tracking control signal from the tracking control unit 23 is output to a driver unit 24. The driver unit 24 supplies a driving current to the actuator 17 in response to the tracking control signal from the tracking control unit 23, so that a position of the objective lens 15 relative to the optical disk 10 is controlled by the actuator 17.

In the conventional optical disk apparatus of FIG. 6, a summing amplifier 25 is provided to output a sum signal indicating a sum of the signals output from the photodiodes 16a and 16b. A high pass filter (HPF) 26 is provided to pass through a high-frequency component of the sum signal from the summing amplifier 26 and eliminate another low-frequency component of the sum signal. A playback signal processing unit 27 is provided to generate a data signal (such as an audio signal) based on the sum signal from the HPF 26. The sum signal provided at the input of the playback signal processing unit 27 is also called a playback signal. The data signal from the playback signal processing unit 27 is output to an output terminal "OUT". An address signal processing unit 28 is provided to generate an address signal based on the sum signal from the HPF 26. The address signal from the address signal processing unit 28 is output to the system controller 30.

In the conventional optical disk apparatus of FIG. 6, a traverse control unit 31 is provided to supply a driving current to a traverse motor 32 in accordance with a control signal "L2" from the system controller 30. The traverse motor 32 is provided to move the optical head 18 in a radial direction of the optical disk 10 in accordance with the driving current from the traverse control unit 31.

Further, in the conventional optical disk apparatus of FIG. 6, a recording signal processing unit 33 is provided to generate a recording signal based on a data signal (such as an audio signal) from an input terminal "IN". The recording signal from the recording signal processing unit 33 is supplied to an LD driver unit 34. The LD driver unit 34 is provided to supply a driving current to the LD 12 in accordance with the recording signal from the recording signal processing unit 33 and a control signal "L3" from the system controller 30. The system controller 30 inputs the address signal supplied from the address signal processing unit 28. The system controller 30 outputs the control signal "L1" to the tracking control unit 23. The system controller 30 outputs the control signal "L2" to the traverse control unit 31. The system controller 30 outputs the control signal "L3" to the LD driver unit 34.

An operation of the conventional optical disk apparatus of FIG. 6 will now be described.

The laser beam emitted by the LD 12 is converted into a parallel beam by the collimator lens 13. The parallel beam passing through the beam splitter 14 is converted into a converging beam by the objective lens 15, and the converging beam forms a light spot on the optical disk 10.

The reflection beam from the optical disk 10 passes through the objective lens 15. This reflection beam carries data according to the data pits 2 on the track of the optical disk 10. The reflection beam is reflected to the photodetector 16 by the beam splitter 14. The photodiodes 16a and 16b in the photodetector 16 convert the received reflection beam into electric signals. The signals from the photodiodes 16a and 16b are supplied to both the differential amplifier 21 and the summing amplifier 25.

The differential amplifier 21 generates a push-pull signal based on the difference between the signals output from the photodiodes 16a and 16b. The low pass filter (LPF) 22 passes through the low-frequency component of the push-pull signal from the differential amplifier 21, and outputs the push-pull signal to the tracking control unit 23 as a tracking error signal. The tracking control unit 23 generates a tracking control signal based on the control signal "L1" from the system controller 30 and the tracking error signal from the LPF 22. The tracking control signal from the tracking control unit 23 is output to the driver unit 24. The driver unit 24 supplies a driving current to the actuator 17 in response to the tracking control signal from the tracking control unit 23, so that a position of the objective lens 15 relative to the optical disk 10 is controlled by the actuator 17. The objective lens 15 is positioned by the actuator 17 in such a direction that the light spot crosses the track of the optical disk 10. The converging beam from the objective lens 15 is focused on the optical disk 10 by the positioning of the objective lens 15. The optical disk 10 is scanned by the optical head 18 while the light spot is moved along the track of the optical disk 10.

The objective lens 15 is positioned by a focusing control unit (not shown) in a direction perpendicular to the surface of the optical disk 10 such that the converging beam from the objective lens 15 correctly forms the light spot on the optical disk 10 at a focal distance of the objective lens 15.

The summing amplifier 25 generates a sum signal based on the sum of the signals output from the photodiodes 16a and 16b. The high pass filter (HPF) 26 passes through the high-frequency component of the sum signal from the summing amplifier 26, and outputs the sum signal to both the playback signal processing unit 27 and the address signal processing unit 28. The playback signal processing unit 27 generates a data signal based on the sum signal from the HPF 26. The data signal from the playback signal processing unit 27 is output to the output terminal "OUT". The address signal processing unit 28 generates an address signal based on the sum signal from the HPF 26. The address signal from the address signal processing unit 28 is output to the system controller 30.

The data signal is produced by the reflection beam as a result of the scanning of the light spot 3 to the data pits 2 of the optical disk as shown in FIG. 5. The address signal is produced by the reflection beam as a result of the scanning of the light spot 3 to the address pits 6 of the optical disk as shown in FIG. 5. The system controller 30 determines a position of the light spot 3 within the optical disk based on the address signal from the address signal processing unit 28.

The traverse control unit 31 supplies a driving current to the traverse motor 32 in accordance with the control signal "L2" from the system controller 30. The traverse motor 32 moves the optical head 18 to a designated track of the optical disk 10 in the radial direction of the optical disk 10 in accordance with the driving current from the traverse control unit 31. At this time, the tracking control unit 23 temporarily stops a tracking servo control for the optical head 18 in response to the control signal "L1" from the system controller 30. When the optical head 18 reproduces data from the optical disk 10, the traverse control unit 31 supplies a driving current to the traverse motor 32 in accordance with the tracking control signal from the tracking control unit 23. The optical head 18 is gradually moved in the radial direction of the optical disk 10 by the traverse control motor 32 in accordance with the progress of the reproduction of data.

When the optical head 18 records data in the optical disk 10, the recording signal processing unit 33 generates a recording signal based on a data signal (such as an audio signal) from the input terminal "IN", and supplies the recording signal to the LD driver unit 34. The system controller 30 outputs the control signal "L3" to the LD driver unit 34 so that the LD driver unit 34 is set in a recording mode. The LD driver unit 34 modulates the driving current in accordance with the recording signal from the recording signal processing unit 33, and supplies the modulated driving current to the LD 12. The intensity of the light spot on the optical disk 10 varies in accordance with the modulated driving current sent to the LD 12 so that the recording pits 2 are formed on the recording layer of the optical disk 10 by the laser beam from the LD 12.

When the optical head 18 reproduces data from the optical disk 10, the system controller 30 outputs the control signal "L3" to the LD driver unit 34 so that the LD driver unit 34 is set in a reproducing mode. The LD driver unit 34 maintains the driving current at a constant level, and supplies the constant level of the driving current to the LD 12. This enables the optical head 18 to detect the recording pits 2 and the address pits 6 on the optical disk 10. When the LD driver unit 34 is set in either the recording mode or the reproducing mode, the spindle motor 9 rotates the optical disk 10 at a constant linear velocity.

FIG. 7 shows a conventional tracking control circuit of an optical disk player apparatus.

In the conventional tracking control circuit of FIG. 7, a tracking control signal is generated based on a differential phase detection (DPD) tracking method. See Japanese Published Application No. 3-18255 for the DPD tracking method.

As shown in FIG. 7, a photodetector 35 is divided into four photodiodes S1, S2, S3 and S4. The photodiodes S1 and S3 convert the received reflection beam into electric signals. The signals from the photodiodes S1 and S3 are supplied to an adder 36. The adder 36 outputs a sum signal indicating a sum of the signals from the photodiodes S1 and S3. The photodiodes S2 and S4 convert the received reflection beam into electric signals. The signals from the photodiodes S2 and S4 are supplied to an adder 37. The adder 37 outputs a sum signal indicating a sum of the signals from the photodiodes S2 and S4.

In the tracking control circuit of FIG. 7, an adder 38 outputs a sum signal "Hf" (=(S1+S3)+(S2+S4)) indicating a sum of the sum signals from the adders 36 and 37. A subtractor 39 outputs a difference signal "D1" (=(S2+S4)−(S1+S3)) indicating a difference between the sum signals from the adders 36 and 37.

In the tracking control circuit of FIG. 7, the sum signal "Hf" from the adder 38 is supplied to each of a zero-crossing detection unit 41 and a zero-crossing detection unit 42. The difference signal "D1" from the subtractor 39 is supplied to each of a sample hold unit 43 and a sample hold unit 44. An output of the zero-crossing detection unit 41 is connected to an input of the sample hold unit 44. An output of the zero-crossing detection unit 42 is connected to an input of the sample hold unit 43.

FIG. 8 shows an operation of the conventional tracking control circuit of FIG. 7.

In FIG. 8, (a) indicates a waveform of the difference signal "D1" at the output of the subtractor 39, and (b) indicates a waveform of the sum signal "D1" at the output of the adder 38.

In the tracking control circuit of FIG. 7, the zero-crossing detection unit 41 outputs a sampling pulse to the sample hold unit 44 when the sum signal "H1" is on the increase and crosses zero, as indicated by (c) in FIG. 8. The zero-crossing detection unit 42 outputs a sampling pulse to the sample hold unit 43 when the sum signal "H1" is on the decrease and crosses zero, as indicated by (d) in FIG. 8. In the sample hold unit 44, the difference signal "D1" is sampled and held by using the sampling pulse from the zero-crossing detection unit 41. In FIG. 8, (e) indicates a waveform of a signal at the output of the sample hold unit 44. Further, in the sample hold unit 43, the difference signal "D1" is sampled and held by using the sampling pulse from the zero-crossing detection unit 42. In FIG. 8, (f) indicates a waveform of a signal at the output of the sample hold unit 43.

As shown in FIG. 8, the phase of the output signal (e) of the sample hold unit 44 and the phase of the output signal (f) of the sample hold unit 43 are substantially opposite to each other. A differential amplifier 45 of the tracking control circuit of FIG. 7 receives the output signals (e) and (f) from the sample hold units 44 and 43 and generates a tracking control signal based on a difference between the output signals (e) and (f).

Hereinafter, the tracking control signal output by the tracking control circuit of FIG. 7 is called a DPD signal. In the tracking control circuit of FIG. 7, a disturbance, such as an offset of the reflection beams received by the photodiodes S1–S4, can be eliminated from the tracking control signal. It is possible for the conventional tracking control circuit of FIG. 7 to output an accurate tracking control signal.

Further, Japanese Published Patent Application Nos. 56-30610 and 2-56734 disclose differential phase detection tracking methods which are similar to the above-described DPD tracking method.

In the DPD tracking method of the above-mentioned publications, a tracking servo control for an optical head is performed. A tracking error signal indicating an error of a light spot from a center of data pits on a track of an optical disk is obtained by detecting a change of an optical intensity distribution of reflection beams received by photodiodes of the optical head. The tracking servo control for the optical head is performed such that the tracking error signal is minimized.

Further, there exists a phase change recording medium in which a crystal phase of a recording layer is changed through a heating and cooling control while emitting a laser beam to the recording layer, so that data is recorded in the recording layer. In the recording layer of the existing phase change recording medium, a first phase which provides a large reflection factor and a second phase which provides a small reflection factor are alternately formed by the laser beam irradiation so that data is optically recorded in the recording layer. Data pits which correspond to the data pits 2 of the optical disk of FIG. 5 are formed in the recording layer by changing the crystal phase to the second phase, and areas of the recording layer where no data pit is formed remains in the first phase.

It is difficult for an existing DVD-ROM player to properly reproduce data from an existing phase change recording medium in a manner similar to an existing DVD-ROM.

The existing phase change recording medium has physical characteristics that provide a reflection factor and an amplitude modulation factor which are less than corresponding factors provided by the DVD-ROM. Because of this, the existing phase change recording medium fails to provide an adequate level of signal intensity for a DPD signal. It is difficult that the DVD-ROM player reproduces data from the existing phase change recording medium in a manner similar to the DVD-ROM. Since the existing phase change recording medium fails to provide an adequate level of signal intensity for a tracking control signal, it is difficult to effectively perform a tracking servo control based on the DPD tracking method. In order to properly reproduce data from the existing phase change recording medium, it is necessary to perform a tracking servo control based on a push-pull method for the conventional optical recording medium.

SUMMARY OF THE INVENTION

An object of the present invention is to provide an improved phase change recording medium in which the above-described problems are eliminated.

Another object of the present invention is to provide an erasable phase change recording medium which enables an optical disk player apparatus, such as a DVD-ROM player, to reproduce data from the recording medium through a tracking servo control based on the differential phase detection method.

A further object of the present invention is to provide an erasable phase change recording medium which enables an optical disk player apparatus, such a DVD-ROM player, to perform the tracking servo control based on the DPD tracking method and enables an optical disk player/recorder apparatus to perform the tracking servo control based on the push-pull method.

The above-mentioned objects of the present invention are achieved by an erasable phase change recording medium comprising: a transparent substrate; a recording layer of a phase change material provided on the protection layer; and a protection layer provided to protect the recording layer on the substrate, wherein tracks are formed with alternate grooves and lands on the substrate of the recording medium and data is recorded to at least one of the grooves and the lands, the recording medium being configured to have a track pitch between 0.6 $\mu$m and 0.8 $\mu$m and a groove depth between 0.11.L and 0.18.L where L is a wavelength of a laser beam.

The above-mentioned objects of the present invention are achieved by an erasable phase change recording medium comprising: a transparent substrate; a recording layer of a phase change material provided on the substrate wherein a first phase providing a large reflection factor and a second phase providing a small reflection factor are formed by changing a crystal phase of the recording layer by laser beam irradiation; and a protection layer provided to protect the recording layer on the substrate, wherein data pits are provided on the recording layer by changing the crystal phase of the recording layer to the second phase, and nonrecorded areas are provided on the recording layer by maintaining the crystal phase of the recording layer in the first phase, wherein the recording medium is configured to have: a reflectance of the first phase of the recording layer ranging from 15% to 40%; a ratio of a reflectance of the second phase of the recording layer to the reflectance of the first phase ranging from 0% to 40%; a track pitch ranging from 0.40 μm to 0.84 μm; and a ratio of a width of one of the data pits to a width of a half diameter of a light spot on the recording medium ranging from 70% to 120%.

The above-mentioned objects of the present invention are achieved by an erasable phase change recording medium comprising: a transparent substrate; a recording layer of a phase change material provided on the substrate wherein a first phase providing a large reflection factor and a second phase providing a small reflection factor are formed by changing a crystal phase of the recording layer by laser beam irradiation; and a protection layer provided to protect the recording layer on the substrate, wherein tracks are formed with alternate grooves and lands on the substrate of the recording medium, data pits are provided on the recording layer by changing the crystal phase of the recording layer to the second phase, and nonrecorded areas are provided on the recording layer by maintaining the crystal phase of the recording layer in the first phase, and wherein an interference layer is provided between the substrate and the recording layer, the interference layer being configured to have a thickness such that a phase difference between a reflection beam from one of the data pits and a reflection beam from one of the nonrecorded areas ranges from 90 degrees to 120 degrees.

In the erasable phase change recording medium of the present invention, the recording medium is configured to have a track pitch between 0.6 μm and 0.8 μm and a groove depth between 0.11.L and 0.18.L where L is a wavelength of a laser beam. The erasable phase change recording medium of the present invention enables the optical disk player apparatus, such as the DVD-ROM player, to effectively reproduce data from the recording medium in a manner similar to the DVD-ROM through the tracking servo control based on the DPD tracking method. It is possible for the erasable phase change recording medium to provide an adequate level of signal intensity for the DPD signal.

In the erasable phase change recording medium of the present invention, the recording medium is configured to have: a reflectance of the first phase of the recording layer which ranges from 15% to 40%; a ratio of a reflectance of the second phase of the recording layer to the reflectance of the first phase which ranges from 0% to 40%; a track pitch which ranges from 0.40 μm to 0.84 μm; and a ratio of a width of one of the data pits to a width of a half diameter of a light spot on the recording medium which ranges from 70% to 120%. The erasable phase change recording medium of the present invention enables the optical disk player apparatus, such as the DVD-ROM player, to effectively reproduce data from the recording medium in a manner similar to the DVD-ROM through the tracking servo control based on the DPD tracking method. It is possible for the erasable phase change recording medium to provide an adequate level of signal intensity for the DPD signal.

Further, in the erasable phase change recording medium of the present invention, the interference layer is provided between the substrate and the recording layer, the interference layer being configured to have a thickness such that a phase difference between a reflection beam from one of the data pits and a reflection beam from one of the nonrecorded areas ranges from 90 degrees to 120 degrees. The erasable phase change recording medium of the present invention enables the optical disk player apparatus to effectively perform the tracking servo control based on the DPD tracking method as well as enables the optical disk player/recorder apparatus to effectively perform the tracking servo control based on the push-pull method.

BRIEF DESCRIPTION OF THE DRAWINGS

Other objects, features and advantages of the present invention will become more apparent from the following detailed description when read in conjunction with the accompanying drawings in which:

FIG. 10 is a diagram for explaining a detailed structure of the recording layer of the embodiment of the phase change recording medium;

DETAILED DESCRIPTION OF THE PREFERRED EMBODIMENTS

A description will now be given of the preferred embodiments of the present invention with reference to the accompanying drawings.

As previously described, the existing phase change recording medium has physical characteristics that provide a reflection factor and an amplitude modulation factor which are less than corresponding factors provided by the DVD-ROM. It is difficult for a DVD-ROM player to reproduce data from an existing phase change recording medium in a manner similar to the DVD-ROM. Since the existing phase change recording medium fails to provide an adequate level of DPD signal intensity, it is difficult to effectively perform a tracking servo control based on the DPD tracking method. In order to properly reproduce data from the existing phase change recording medium, it is necessary to utilize the push-pull method of the optical disk similar to the conventional optical recording medium.

An erasable phase change recording medium according to a first aspect of the present invention is configured to enable the existing DVD-ROM player to properly reproduce data from the phase change recording medium by performing a tracking servo control based on the DPD tracking method. A description will now be given of the erasable phase change recording medium according to the first aspect of the present invention.

Figure 4:
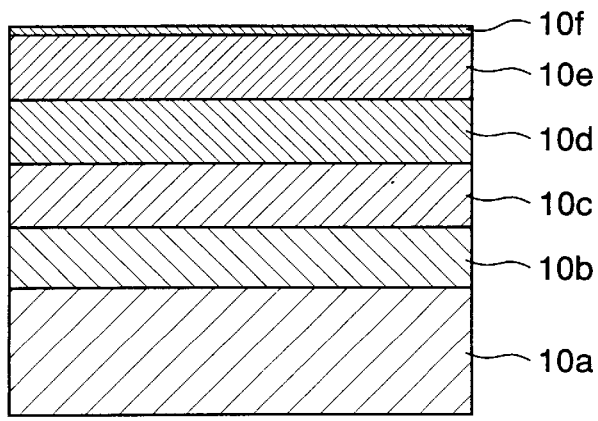
FIG. 4 is a diagram for explaining a construction of the embodiment of the phase change recording medium of the present invention.

FIG. 4 shows a construction of one embodiment of the erasable phase change recording medium of the present invention.

As shown in FIG. 4, the phase change recording medium of the present embodiment has a multiple-layer structure and includes a substrate 10a, a lower protection layer 10b, a recording layer 10c, an upper protection layer 10d, a heat radiation layer 10e, and a UV (ultraviolet ray) protection layer 10f.

In the phase change recording medium of FIG. 4, the substrate 10a is made of, for example, a polycarbonate (PC) resin. The substrate 10a of this embodiment is a transparent substrate. The lower protection layer 10b is deposited on the substrate 10a. The lower protection layer 10b is made of, for example, ZnS, $SiO_2$, or SiNx. The recording layer 10c is deposited on the lower protection layer 10b. The recording layer 10c is made of a phase change material which is, for example, AgInSbTe or GeSbTe. The upper protection layer 10d is deposited on the recording layer 10c. The upper protection layer 10d is made of, for example, ZnS, $SiO_2$, or SiNx. The heat radiation layer 10e is deposited on the upper protection layer 10d. The heat radiation layer 10e is made of, for example, Al, an aluminum alloy, Au, or Ag. The UV protection layer 10f is deposited on the heat radiation layer 10e. The UV protection layer 10f is made of a UV curing resin.

However, the above-described structure of the phase change recording medium of the present embodiment is given for the purpose of exemplification. The phase change recording medium of the present invention is not limited to the above-described structure.

In the phase change recording medium of the present embodiment, tracks are formed with alternate grooves and lands on the substrate of the recording medium. There are two methods of recording data in the phase change recording medium of the present embodiment: data is recorded to only the grooves; and data is recorded to both the grooves and the lands.

Figure 1A:
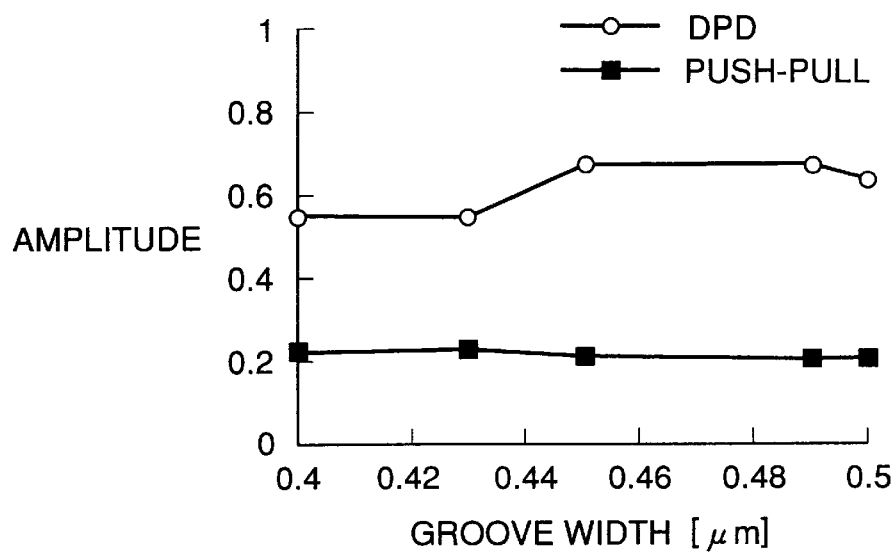
FIG. 1A and FIG. 1B are charts for explaining a relationship between groove width and DPD signal amplitude and a relationship between groove width and push-pull signal amplitude for one embodiment of an erasable phase change recording medium of the present invention.

FIG. 1A shows a relationship between groove width and DPD signal amplitude and a relationship between groove width and push-pull signal amplitude both obtained as a result of measurement performed for the above embodiment in which data is recorded to only the grooves on the substrate of the phase change recording medium.

The following TABLE 1 indicates actual measurement values used to show the relationship of FIG. 1A.

TABLE 1

| GROOVE WIDTH | AMPLITUDE [V] | |
|---|---|---|
| [μm] | DPD SIGNAL | PUSH-PULL SIGNAL |
| 0.4 | 0.56 | 0.23 |
| 0.43 | 0.56 | 0.24 |
| 0.45 | 0.69 | 0.22 |
| 0.49 | 0.68 | 0.21 |
| 0.5 | 0.65 | 0.21 |

Figure 1B:
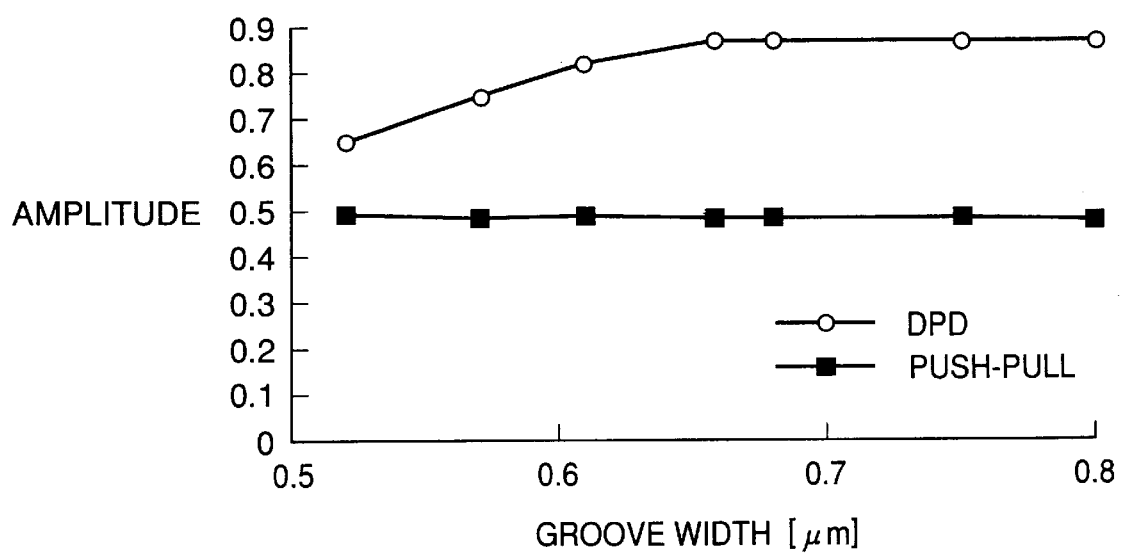

FIG. 1B shows a relationship between groove width and DPD signal amplitude and a relationship between groove width and push-pull signal amplitude obtained as a result of measurement performed for the above embodiment of the phase change recording medium in which data is recorded to both the grooves and the lands on the substrate of the recording medium.

The following TABLE 2 indicates actual measurement values used to show the relationship of FIG. 1B.

TABLE 2

| GROOVE WIDTH | AMPLITUDE [V] | |
|---|---|---|
| [μm] | DPD SIGNAL | PUSH-PULL SIGNAL |
| 0.52 | 0.65 | 0.49 |
| 0.57 | 0.75 | 0.48 |
| 0.61 | 0.82 | 0.49 |
| 0.66 | 0.87 | 0.48 |
| 0.68 | 0.87 | 0.48 |
| 0.75 | 0.87 | 0.48 |
| 0.8 | 0.87 | 0.48 |

In FIGS. 1A and 1B and TABLEs 1 and 2, the groove width indicates a width of one of the grooves of the phase change recording medium of the present embodiment in a radial direction of the phase change recording medium. The DPD signal amplitude indicates an amplitude of a DPD signal output by a tracking control circuit for the phase change recording medium of the present embodiment, the tracking control circuit being similar to the tracking control circuit of FIG. 7. The push-pull signal amplitude indicates an amplitude of a push-pull signal generated by an optical disk apparatus for the phase change recording medium of the present embodiment, the optical disk apparatus being similar to the optical disk apparatus of FIG. 6.

The phase change recording medium of the present embodiment in both the groove recording case of FIG. 1A and the groove-and-land recording case of FIG. 1B is configured such that the recording medium has a track pitch of 0.74 μm and a groove depth of 0.145.L where L is a wavelength of a laser beam emitted by the optical disk apparatus.

As shown in FIGS. 1A and 1B, it is apparent that the phase change recording medium of the present embodiment in both the groove recording case and the groove-and-land recording case enables an existing optical disk apparatus, such as the DVD-ROM player, to reproduce data from the recording medium in a manner similar to the DVD-ROM by performing the tracking servo control based on the DPD tracking method. In the groove recording case, the phase change recording medium provides an adequate level of signal intensity for the DPD signal when the phase change recording medium is configured with a groove width between 0.4 μm and 0.5 μm. In the groove-and-land recording case, the phase change recording medium provides an adequate level of signal intensity for the DPD signal when the phase change recording medium is configured with a groove width between 0.5 μm and 0.8 μm.

Figure 2A:
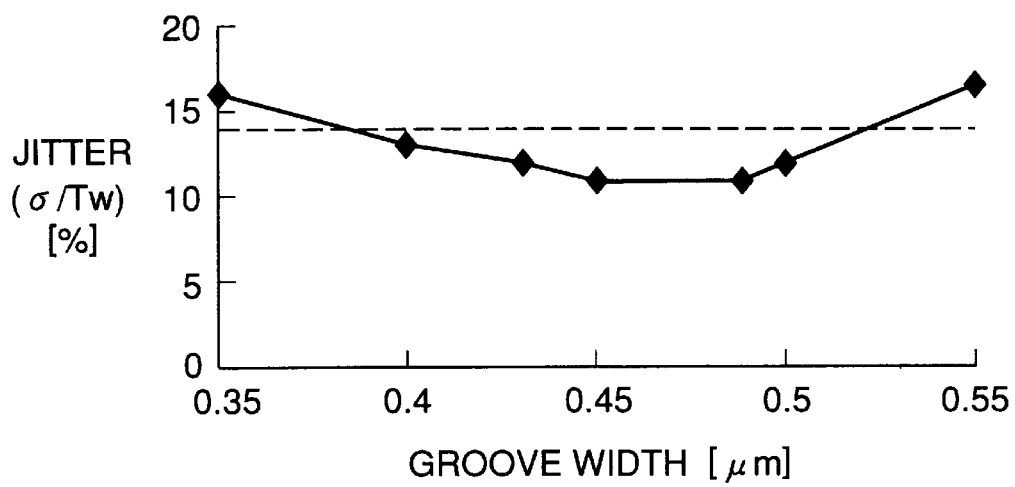
FIG. 2A and FIG. 2B are charts for explaining a relationship between groove width and jitter, a relationship between groove depth and trackcross signal amplitude, and a relationship between groove depth and push-pull signal amplitude for the embodiment of the phase change recording medium.

FIG. 2A shows a relationship between groove width and jitter obtained as a result of measurement performed for the above embodiment of the phase change recording medium.

The following TABLE 3 indicates actual measurement values used to show the relationship of FIG. 2A.

TABLE 3

| GROOVE WIDTH [μm] | JITTER o/Tw [%] |
|---|---|
| 0.35 | 16 |
| 0.4 | 13 |
| 0.43 | 12 |
| 0.45 | 11 |
| 0.49 | 11 |
| 0.5 | 12 |
| 0.55 | 17 |

As shown in FIG. 2A, it is found that the phase change recording medium of the present embodiment enables the jitter to be reduced below 14% if the phase change recording medium is configured such that the recording medium has a groove width between 0.4 μm and 0.5 μm.

Figure 2B:
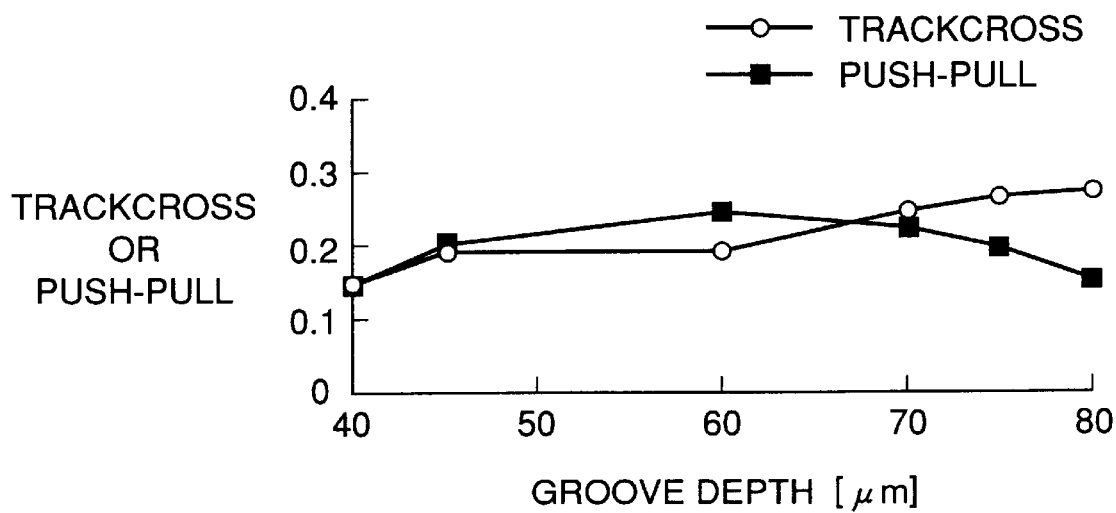

FIG. 2B shows a relationship between groove depth and trackcross signal amplitude and a relationship between groove depth and push-pull signal amplitude both obtained as a result of measurement performed for the above embodiment of the phase change recording medium.

The following TABLE 4 indicates actual measurement values used to show the relationships of FIG. 2B.

TABLE 4

| GROOVE DEPTH [nm] | AMPLITUDE | |
|---|---|---|
| | TRACKCROSS | PUSH-PULL SIGNAL |
| 40 | 0.15 | 0.15 |
| 45 | 0.19 | 0.2 |
| 60 | 0.2 | 0.25 |
| 70 | 0.25 | 0.23 |
| 75 | 0.27 | 0.2 |
| 80 | 0.28 | 0.16 |

In FIG. 2B, the groove depth indicates a depth of one of the grooves of the phase change recording medium of the present embodiment. A groove depth of 45 nm corresponds to a length of 0.11.L (where L is a wavelength of the laser beam), and a groove depth of 75 nm corresponds to a length of 0.18.L. The trackcross signal amplitude indicates an amplitude of a trackcross signal normalized at a mirror portion of an optical disk apparatus for the phase change recording medium of the present embodiment, the optical disk apparatus being similar to the optical disk apparatus of FIG. 6. The push-pull signal amplitude indicates an amplitude of a push-pull signal normalized at a mirror portion of an optical disk apparatus for the phase change recording medium of the present embodiment, the optical disk apparatus being similar to the optical disk apparatus of FIG. 6. The measurement of FIG. 2B is performed by setting a ¼L period in a range between 0.36.L and 0.43.L.

As shown in FIG. 2B, it is found that the phase change recording medium of the present embodiment enables the push-pull signal amplitude to be increased above 0.15 if the phase change recording medium is configured such that the recording medium has a groove depth between 0.11.L and 0.18.L (where L is a wavelength of the laser beam) and a ¼L period between 0.36.L and 0.43.L. The phase change recording medium of the present embodiment enables an existing optical disk apparatus, such as the DVD-ROM player, to reproduce data from the recording medium in a manner similar to the DVD-ROM by performing the tracking servo control based on either the push-pull method or the DPD tracking method.

Figure 3:
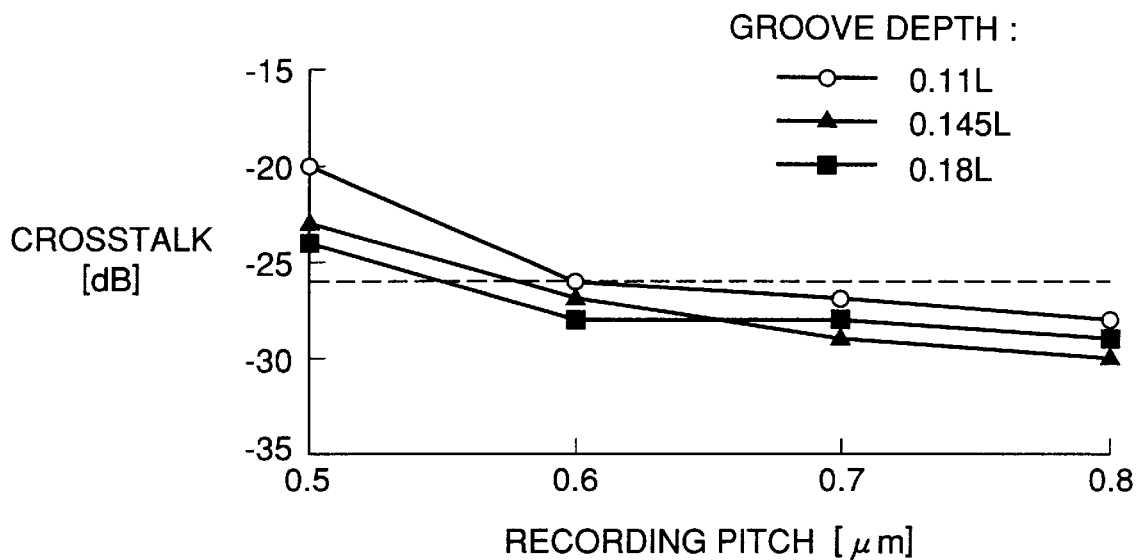
FIG. 3 is a chart for explaining a relationship between recording pitch and crosstalk for the embodiment of the phase change recording medium.

FIG. 3 shows a relationship between recording pitch and crosstalk obtained as a result of measurement performed for the above embodiment of the phase change recording medium.

The following TABLE 5 indicates actual measurement values used to show the relationship of FIG. 3.

TABLE 5

| RECORDING PITCH | CROSSTALK [dB] | | |
|---|---|---|---|
| [μm] | 0.11 · L | 0.145 · L | 0.18 · L |
| 0.5 | −20 | −23 | −24 |
| 0.6 | −26 | −27 | −28 |
| 0.7 | −27 | −29 | −28 |
| 0.8 | −28 | −30 | −29 |

In FIG. 3, the recording pitch indicates a track pitch of the phase change recording medium of the present embodiment when data is recorded to both the grooves and the lands in the recording medium. The crosstalk indicates a crosstalk between data signals on adjacent tracks of the phase change recording medium of the present embodiment in a case in which the recording medium is configured to have one of three groove depths: 0.11.L, 0.145.L, and 0.18.L (where L is a wavelength of the laser beam).

As shown in FIG. 3, it is found that the phase change recording medium of the present embodiment enables the crosstalk to be reduced below −26 dB if the phase change recording medium is configured such that the recording medium has a track pitch between 0.6 μm and 0.8 μm, a groove depth between 0.11.L and 0.18.L, and a ¼L period between 0.36.L and 0.43.L. The above-mentioned track pitch corresponds to a track density which allows the DVD-ROM player to accurately reproduce data from the recording medium through the tracking servo control. The phase change recording medium of the present embodiment enables an existing optical disk apparatus, such as the DVD-ROM player, to reproduce data from the recording medium in a manner similar to the DVD-ROM by performing the tracking servo control based on either the push-pull method or the DPD tracking method.

In the above-described embodiment, the phase change recording medium enables the existing optical disk apparatus, such as the DVD-ROM player, to reproduce data from the recording medium in a manner similar to the DVD-ROM through the tracking servo control based on the DPD tracking method. It is possible for the phase change recording medium to provide an adequate level of signal intensity for the DPD signal.

In a case of an existing phase change recording medium, data is recorded to all the tracks in the recording medium and no data is recorded outside a final track of the recording medium. However, when data is reproduced from the final track of the existing phase change recording medium, it is difficult that the optical disk apparatus accurately reproduces the data from the final track of the recording medium through the tracking servo control based on the DPD tracking method.

In order to eliminate the above-mentioned problem, the phase change recording medium of the present embodiment is configured such that dummy data is recorded to an extra track outside a final track of the phase change recording medium. By this configuration, it is possible that the optical disk apparatus accurately reproduce data from all the tracks of the phase change recording medium of the present embodiment through the tracking servo control based on the DPD tracking method even when the final track is accessed.

Next, an erasable phase change recording medium according to a second aspect of the present invention is configured to enable the existing DVD-ROM player to properly reproduce data from the phase change recording medium through the tracking servo control based on the DPD tracking method. A description will now be given of the erasable phase change recording medium according to the second aspect of the present invention.

As previously described, the existing phase change recording medium has physical characteristics that provide a reflection factor and an amplitude modulation factor which are less than corresponding factors provided by the DVD-ROM. It is difficult that the DVD-ROM player reproduces data from the existing phase change recording medium in a manner similar to the DVD-ROM. Since the existing phase change recording medium fails to provide an adequate level of DPD signal intensity, it is difficult to effectively perform a tracking servo control based on the DPD tracking method. In order to reproduce data from the existing phase change recording medium, it is necessary to utilize the push-pull method of the optical disk similar to the conventional optical recording medium.

Figure 5:
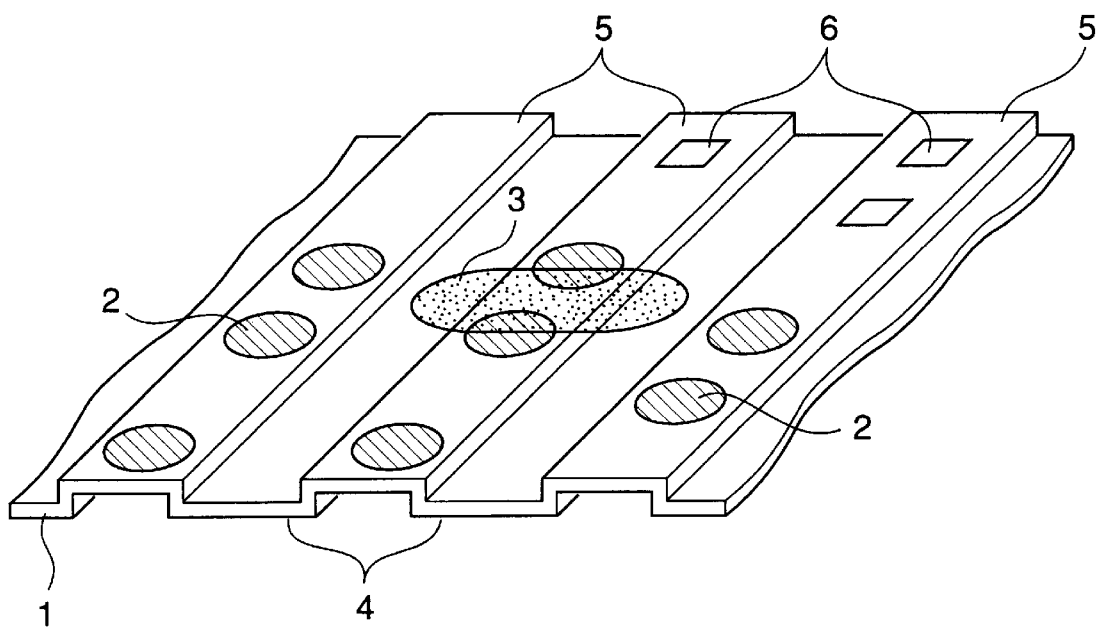
FIG. 5 is an enlarged diagram of a conventional phase change recording medium.

In this embodiment of the phase change recording medium of the present invention, the crystal phase of the recording layer is changed through a heating and cooling control while emitting the laser beam to the recording layer, so that data is optically recorded in the recording layer. In the recording layer of the phase change recording medium of the present embodiment, a first phase providing a large reflection factor and a second phase providing a small reflection factor are formed by changing the crystal phase of the recording layer by laser beam irradiation. Data pits (corresponding to the data pits 2 of the optical disk of FIG. 5) are provided on the recording layer by changing the crystal phase of the recording layer to the second phase. Unrecorded areas of the recording medium (where no data pit is provided) are provided on the recording layer by maintaining the crystal phase of the recording layer in the first phase.

In the phase change recording medium of the present embodiment, the data pits are arranged on the recording layer in one of a spiral pattern, a coaxial pattern, and a parallel pattern.

The phase change recording medium of the present embodiment has a construction similar to the construction of the phase change recording medium shown in FIG. 4. That is, the phase change recording medium of the present embodiment may include the substrate 10a, the lower protection layer 10b, the recording layer 10c, the upper protection layer 10d, the heat radiation layer 10e, and the UV protection layer 10f. However, the above-described structure of FIG. 4 is given for the purpose of exemplification. The phase change recording medium of the present invention is not limited to the above-described structure.

Figure 6:
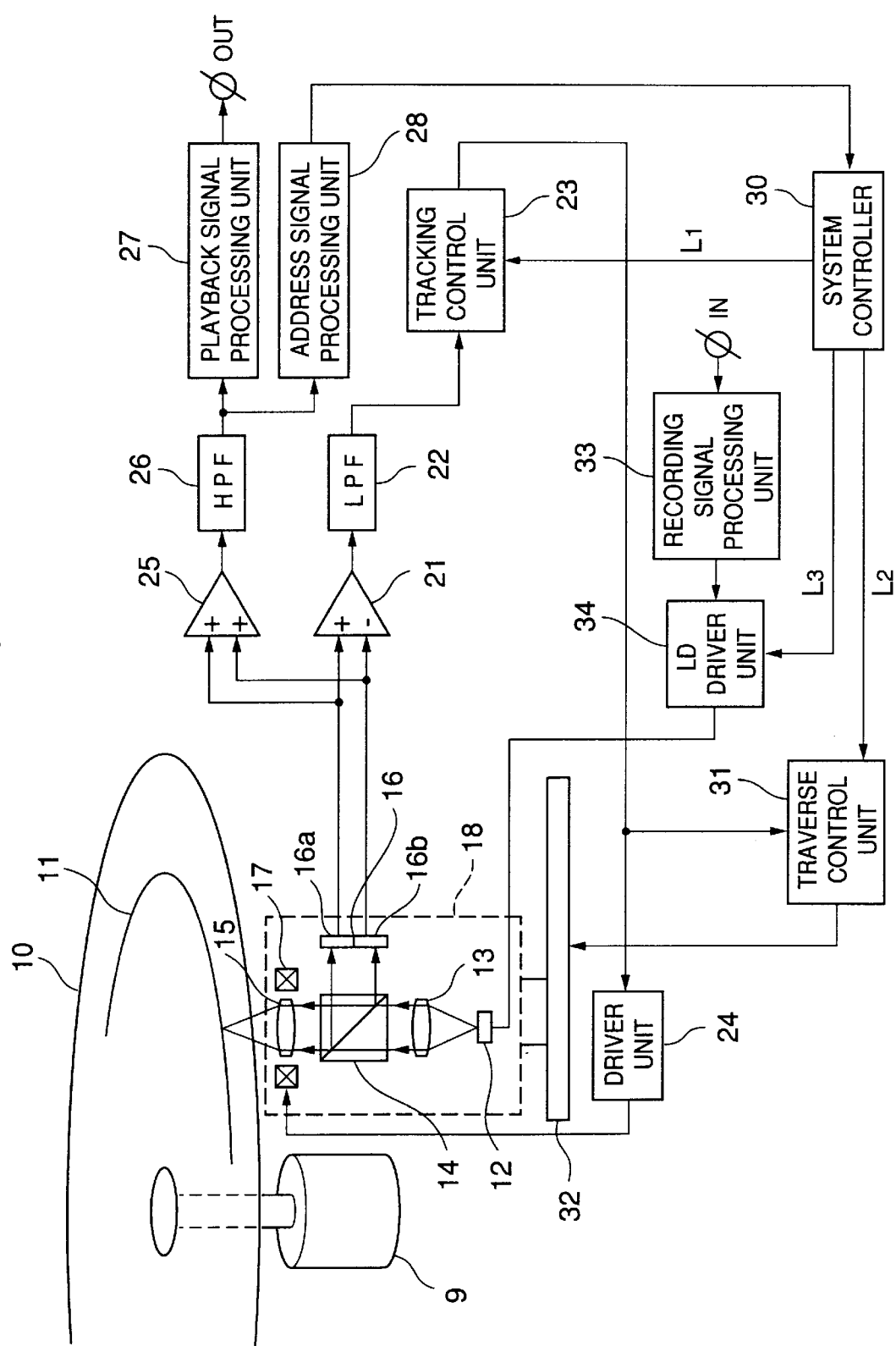
FIG. 6 is a diagram of a conventional optical disk player/recorder apparatus which accesses an optical disk similar to the conventional phase change recording medium of FIG. 5.

In the phase change recording medium of the present embodiment, a reflection factor of the first phase of the recording layer corresponds to a high level of the playback signal at the input of the playback signal processing unit 27 of the optical disk apparatus of FIG. 6. A reflection factor of the second phase of the recording layer corresponds to a low level of the playback signal at the input of the playback signal processing unit 27 of the optical disk apparatus of FIG. 6.

Generally, in order to allow the DVD-ROM player to properly reproduce data from a phase change recording medium through the tracking servo control based on the DPD tracking method, it is necessary that the phase change recording medium satisfies the following requirements:

(1) a reflection factor of the first phase in the recording layer of the phase change recording medium must be above 18%;

(2) an amplitude modulation coefficient F of the recording layer of the phase change recording medium must be above 60%, the amplitude modulation coefficient being defined by the formula: $F=(RH-RL)/RH$ where RH is a high level of a playback signal for the first phase and RL is a low level of the playback signal for the second phase; and (3) a tracking control signal (or the DPD signal) must be generated by the DVD-ROM player through the tracking servo control based on the DPD tracking method.

The above requirements (1) through (3) are substantially the same as fundamental specifications which the existing DVD-ROM must satisfy. It is found that phase change materials, such as AgInSbTe and GeSbTe, provide an appropriate reflection factor, an appropriate amplitude modulation factor and an appropriate sensitivity for a recording layer of a phase change recording medium, and that the recording layers of the above-mentioned materials satisfy the above requirements (1) through (3). However, the phase change material of the recording layer of the present embodiment is not limited to the above-mentioned materials.

The phase change recording medium of the present embodiment is characterized in that the phase change recording medium is configured such that the recording medium has:

(1) a reflectance of the first phase of the recording layer ranging from 15% to 40%;

(2) a ratio of a reflectance of the second phase of the recording layer to the reflectance of the first phase ranging from 0% to 40%;

(3) a track pitch ranging from 0.40 μm to 0.84 μm; and (4) a ratio of a width of one of the data pits to a width of a half diameter of a light spot formed on the recording medium ranging from 70% to 120%.

As a result of measurement performed in various manners for the phase change recording medium of the present embodiment, it is found that the phase change recording medium which is configured in the above-mentioned manner enables the optical disk apparatus, such as the DVD-ROM player, to properly reproduce data from the phase change recording medium through the tracking servo control based on the differential phase detection (DPD) method.

As described above, in the phase change recording medium of the present embodiment, the data pits are provided on the recording layer by changing the crystal phase of the recording layer to the second phase, and nonrecorded areas are provided on the recording layer by maintaining the crystal phase of the recording layer in the first phase. The data pits are arranged on the recording layer in one of a spiral pattern, a coaxial pattern, and a parallel pattern.

Similar to the previously described phase change recording medium of FIG. 1A through FIG. 4, in the phase change recording medium of the present embodiment, tracks are formed with alternate grooves and lands on the substrate of the recording medium and the data pits are recorded to at least one of the grooves and the lands. There are two methods of recording the data pits in the phase change recording medium of the present embodiment: the data pits are recorded to only one of the grooves and the lands; and the data pits are recorded to both the grooves and the lands.

As the phase change recording medium of the present embodiment is configured in the above-mentioned manner, the phase change recording medium enables the optical disk apparatus, such as the DVD-ROM player, to properly reproduce data from the recording medium in a manner similar to the DVD-ROM through the tracking servo control based on the DPD tracking method. It is possible for the phase change recording medium to provide an adequate level of signal intensity for the DPD signal (corresponding to the tracking control signal output by the tracking control circuit of FIG. 7).

Next, an erasable phase change recording medium according to a third aspect of the present invention is configured to enable the optical disk player apparatus (such as the DVD-ROM player) to perform the tracking servo control based on the DPD tracking method as well as to enable the optical disk player/recorder apparatus to perform the tracking servo control based on the push-pull method. A description will now be given of the erasable phase change recording medium according to the third aspect of the present invention.

Figure 9A:
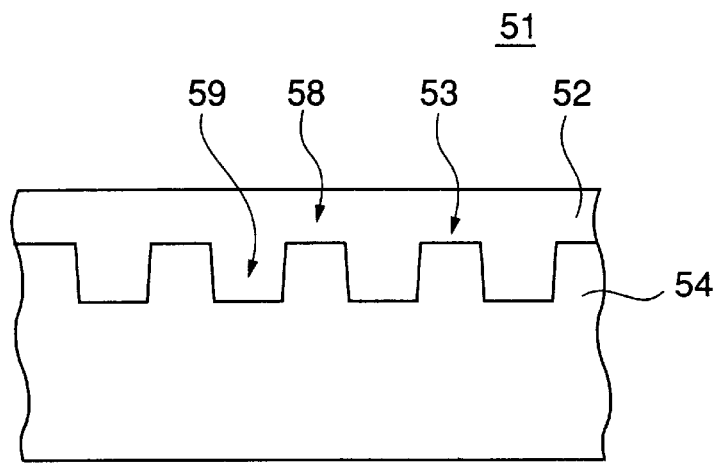
FIG. 9A and FIG. 9B are diagrams for explaining a construction of another embodiment of the phase change recording medium of the present invention.
Figure 9B:
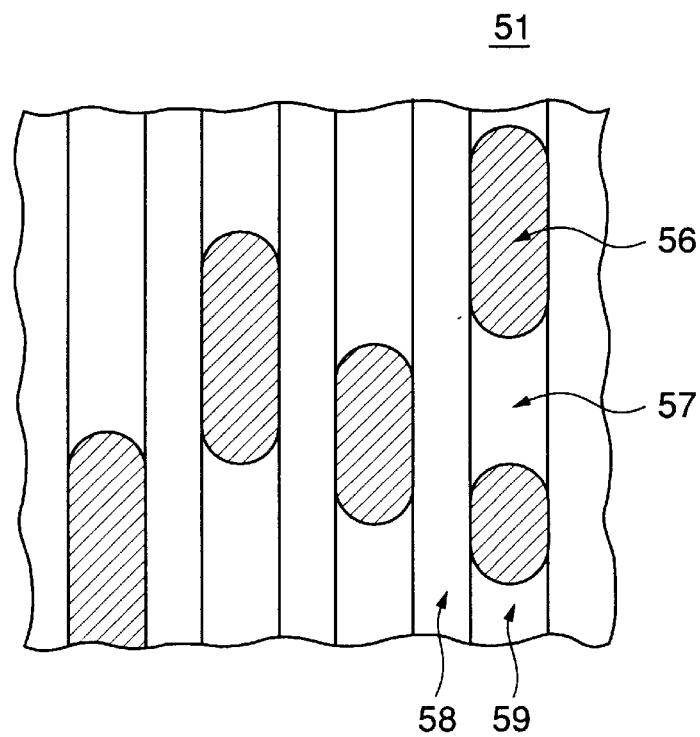

FIG. 9A and FIG. 9B show a construction of one embodiment of the erasable phase change recording medium according to the third aspect of the present invention. FIG. 9A is a cross-sectional view of an erasable phase change recording medium 51 of this embodiment, and FIG. 9B is a plan view of a recording layer of the phase change recording medium 51 of this embodiment. FIG. 10 is an enlarged view of the recording layer of the phase change recording medium 51 of FIG. 9A.

As shown in FIG. 9A, the erasable phase change recording medium 51 includes a transparent substrate 54, a recording layer 53, and a protection layer 52. The phase change recording medium 51 is adapted to record data in the recording medium and reproduce data from the recording medium, and the data in the recording medium is erasable. The recording layer 53 is provided on the substrate 54. The protection layer 52 is provided to protect the recording layer 53 on the substrate 54. However, the above-described structure of the phase change recording medium 51 is given for the purpose of exemplification. The phase change recording medium of the present invention is not limited to the above-described structure.

As shown in FIG. 9B, in the recording layer 53 of the phase change recording medium of the present embodiment, tracks are formed with alternate lands 58 and grooves 59 on the substrate 54 of the recording medium 51. Data pits 56 (corresponding to the data pits 2 of the optical disk of FIG. 5) are provided on the recording layer 53 of the phase change recording medium 51 by changing the crystal phase of the recording layer 53 to the second phase. Unrecorded areas 57 of the phase change recording medium 51 (where no data pit is provided) are provided on the recording layer 53 by maintaining the crystal phase of the recording layer 53 in the first phase.

Similar to the previously described embodiment, in the recording layer 53 of the phase change recording medium 51, the first phase which provides a large reflection factor and the second phase which provides a small reflection factor are formed by changing the crystal phase of the recording layer 53 by laser beam irradiation. The data pits 56 are arranged on the recording layer 53 in a spiral pattern.

As shown in FIG. 10, the recording layer 53 of the phase change recording medium 51 of the present embodiment is constructed in a multiple-layer structure and includes a heat radiation layer 53a, a heat insulating layer 53b, a phase change recording layer 53c, and an interference layer 53d. The interference layer 53d is deposited on the substrate 54. The interference layer 53d is made of, for example, ZnS-SiO$_2$. The phase change recording layer 53c is deposited on the interference layer 53d. The phase change recording layer 53c is made of a phase change material which is, for example, GeSb. The heat insulating layer 53b is deposited on the phase change recording layer 53c. The heat insulating layer 53b is made of, for example, ZnSSiO$_2$. The heat radiation layer 53a is deposited on the heat insulating layer 53b. The heat radiation layer 53a is made of, for example, AlTi.

In the recording layer 53 of the phase change recording medium 51 of the present embodiment, the crystal phase of the recording layer 53 is changed through a heating and cooling control while emitting the laser beam to the recording layer 53, so that data is optically recorded in the recording layer 53. A first phase providing a large reflection factor and a second phase providing a small reflection factor are formed by changing the crystal phase of the recording layer by laser beam irradiation. The data pits 56 are provided on the recording layer 53 by changing the crystal phase of the recording layer 53 to the second phase. The unrecorded areas 57 of the recording medium 51 (where no data pit is provided) are provided on the recording layer 53 by maintaining the crystal phase of the recording layer 53 in the first phase.

When the recording layer 53 of the phase change recording medium 51 is heated by the laser beam irradiation and quickly cooled, the crystal phase of the recording layer 53 is changed to the second phase (or the data pits 56) which provides a small reflection factor. When the recording layer 53 of the phase change recording medium 51 is heated by the laser beam irradiation and slowly cooled, the crystal phase of the recording layer 53 is changed to the first phase (or the nonrecorded areas 57) which provides a large reflection factor.

If the phase change recording layer 53c is excessively heated by the laser beam irradiation, recording characteristics of the recording layer 53 fluctuate so that data may not properly be recorded in the recording layer 53. The heat radiation layer 53a and the heat insulating layer 53b are provided to avoid such a problem. The heat radiation layer 53a serves to provide appropriate heat radiation or dissipation for the recording layer 53 of the phase change recording medium 51. The heat insulating layer 53b serves to maintain a temperature of the phase change recording layer 53c in an appropriate temperature range.

In the phase change recording medium 51 of the present embodiment, the interference layer 53d is interposed between the transparent substrate 54 and the phase change recording layer 53c. The interference layer 53d serves to provide an appropriate phase difference between a reflection beam from one of the data pits 56 and a reflection beam from one of the nonrecorded areas 57, and serves to provide an appropriate ratio of a reflection factor of the data pits 56 to a reflection factor of the nonrecorded areas 57, which will be described later.

Figure 11:
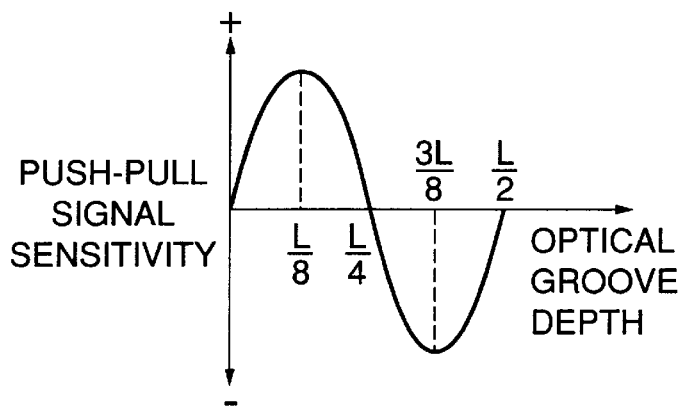
FIG. 11 is a chart for explaining a relationship between optical groove depth and push-pull signal sensitivity for the embodiment of the phase change recording medium.

FIG. 11 shows a relationship between optical groove depth and push-pull signal sensitivity for the present embodiment of the phase change recording medium.

In FIG. 11, an optical groove depth of the grooves 59 of the phase change recording medium 51 and a sensitivity of the push-pull signal generated with respect to the phase change recording medium 51 having the optical groove depth are indicated. The optical groove depth is represented by a function of a wavelength "L" of a laser beam. Since the laser beam passes through the transparent substrate 54 of the recording medium 51, an actual groove depth "d" of the grooves 59 is calculated by dividing the optical groove depth of the grooves 59 by a refractive index "n" of the transparent substrate 54. For example, if the optical groove depth is equal to L/8, the wavelength "L" is equal to 640 nm, and the refractive index "n" is equal to 1.58, then the actual groove depth "d" of the grooves 59 is approximately equal to 50.6 nm.

As shown in FIG. 11, in order to maximize the push-pull signal sensitivity, it is necessary that the optical groove depth of the grooves 59 be set at L/8. By setting the optical groove depth of the grooves 59 at L/8, the phase change recording medium of the present embodiment enables the optical disk player/recorder apparatus to properly perform the tracking servo control based on the push-pull method. In this case, the phase change recording medium of the present embodiment is configured to have a phase difference of 90 degrees between the reflection beam from one of the lands 58 and the reflection beam from one of the grooves 59. It is possible that the phase change recording medium of the present embodiment provide an adequate level of signal intensity for the tracking servo control performed by the optical disk player/recorder apparatus.

Specifically, in the phase change recording medium of the present embodiment, the grooves 59 of the recording layer 53 are configured to have such an optical groove depth that a phase difference between the reflection beam from one of the lands 58 and the reflection beam from one of the grooves 59 is set at 90 degrees, by taking account of the relationship between optical groove depth and push-pull signal sensitivity of FIG. 11.

Further, in order to allow the optical disk player apparatus (such as the DVD-ROM player) to perform the tracking servo control based on the DPD tracking method, the interference layer 53d of the recording layer 53 of the phase change recording medium of the present embodiment is configured to have a thickness such that a phase difference between a reflection beam from one of the data pits 56 and a reflection beam from one of the nonrecorded areas 57 ranges from 90 degrees to 120 degrees. As described above, the interference layer 53d is interposed between the transparent substrate 54 and the phase change recording layer 53c, and serves to provide an appropriate phase difference between the reflection beam from one of the data pits 56 and the reflection beam from one of the nonrecorded areas 57 and to provide an appropriate ratio of the reflection factor of the data pits 56 to the reflection factor of the nonrecorded areas 57.

Figure 12:
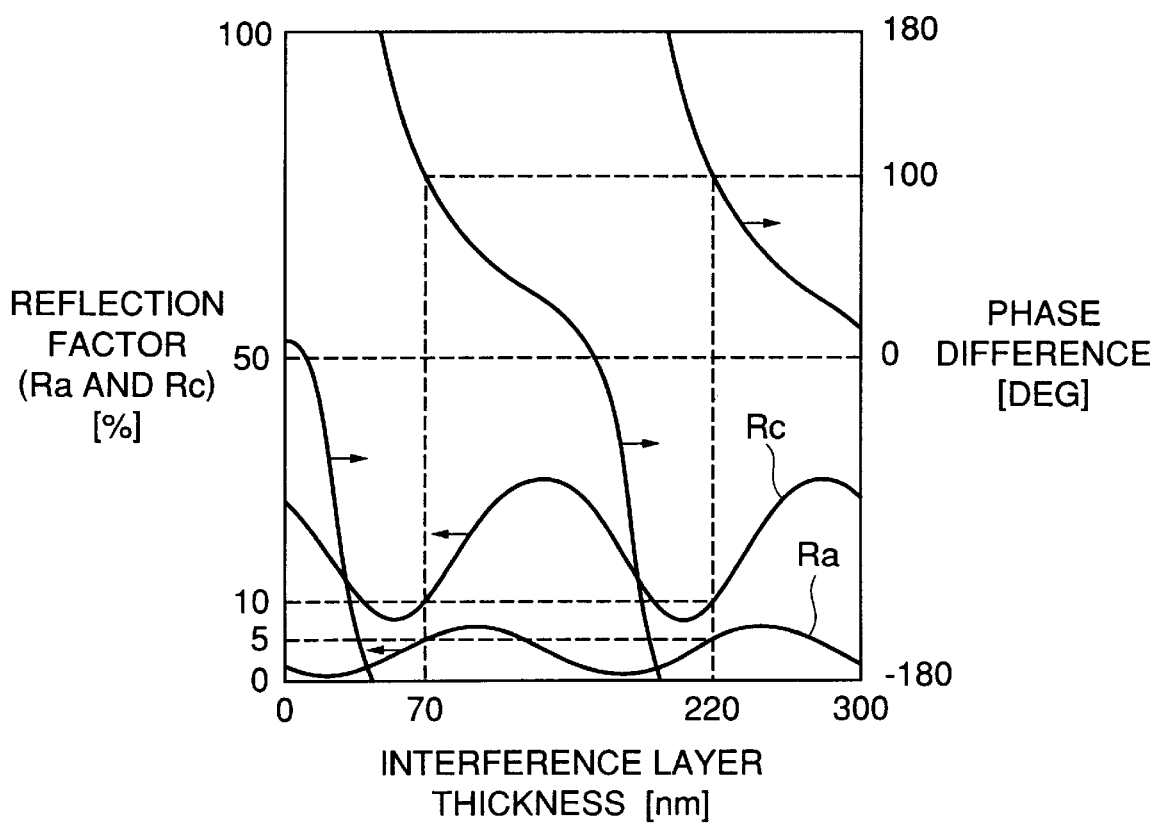
FIG. 12 is a chart for explaining a relationship between interference layer thickness and reflection factor and a relationship between interference layer thickness and phase difference for the embodiment of the phase change recording medium.

FIG. 12 shows a relationship between interference layer thickness and reflection factor and a relationship between interference layer thickness and phase difference for the present embodiment of the phase change recording medium.

In FIG. 12, a thickness of the interference layer 53d of the phase change recording medium 51 and a phase difference between the reflection beam from one of the data pits 56 and the reflection beam from one of the nonrecorded areas 57 with respect to the interference layer thickness are indicated. Further, a thickness of the interference layer 53d of the phase change recording medium 51, a reflection factor "Ra" of the data pits 56 and a reflection factor "Rc" of the nonrecorded areas 57 with respect to the interference layer thickness are indicated.

As shown in FIG. 12, in order to set the phase difference at, for example, 100 degrees, it is necessary that the interference layer 53d of the recording layer 53 of the phase change recording medium of the present embodiment be configured to have a thickness of 70 nm or 220 nm. In this case, the reflection factor "Ra" of the data pits 56 is equal to 5% and the reflection factor "Rc" of the nonrecorded areas 57 is equal to 10%. That is, the ratio "R" of the reflection factor "Ra" to the reflection factor "Rc" is equal to 50%.

Figure 13:
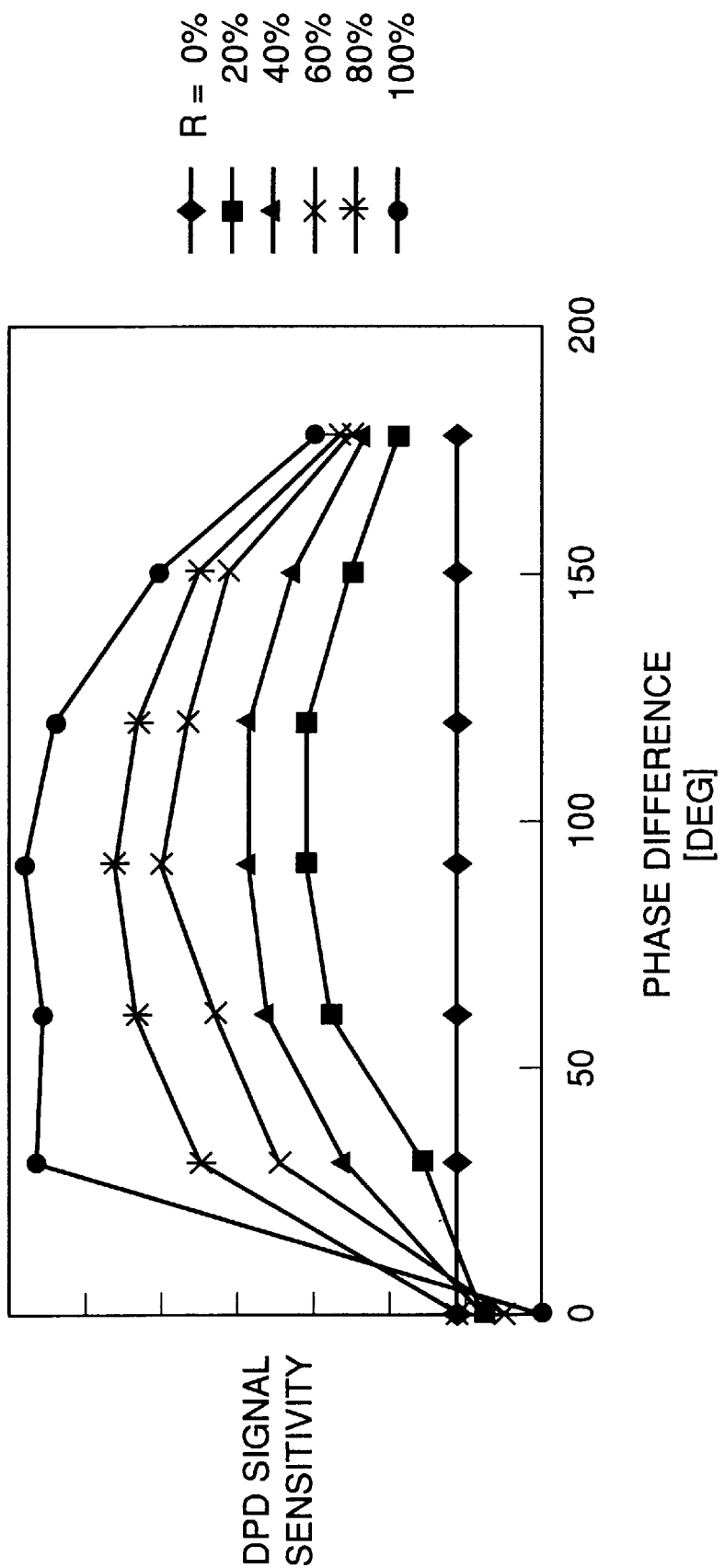
FIG. 13 is a chart for explaining a relationship between phase difference and DPD signal sensitivity for the embodiment of the phase change recording medium.
Figure 14:
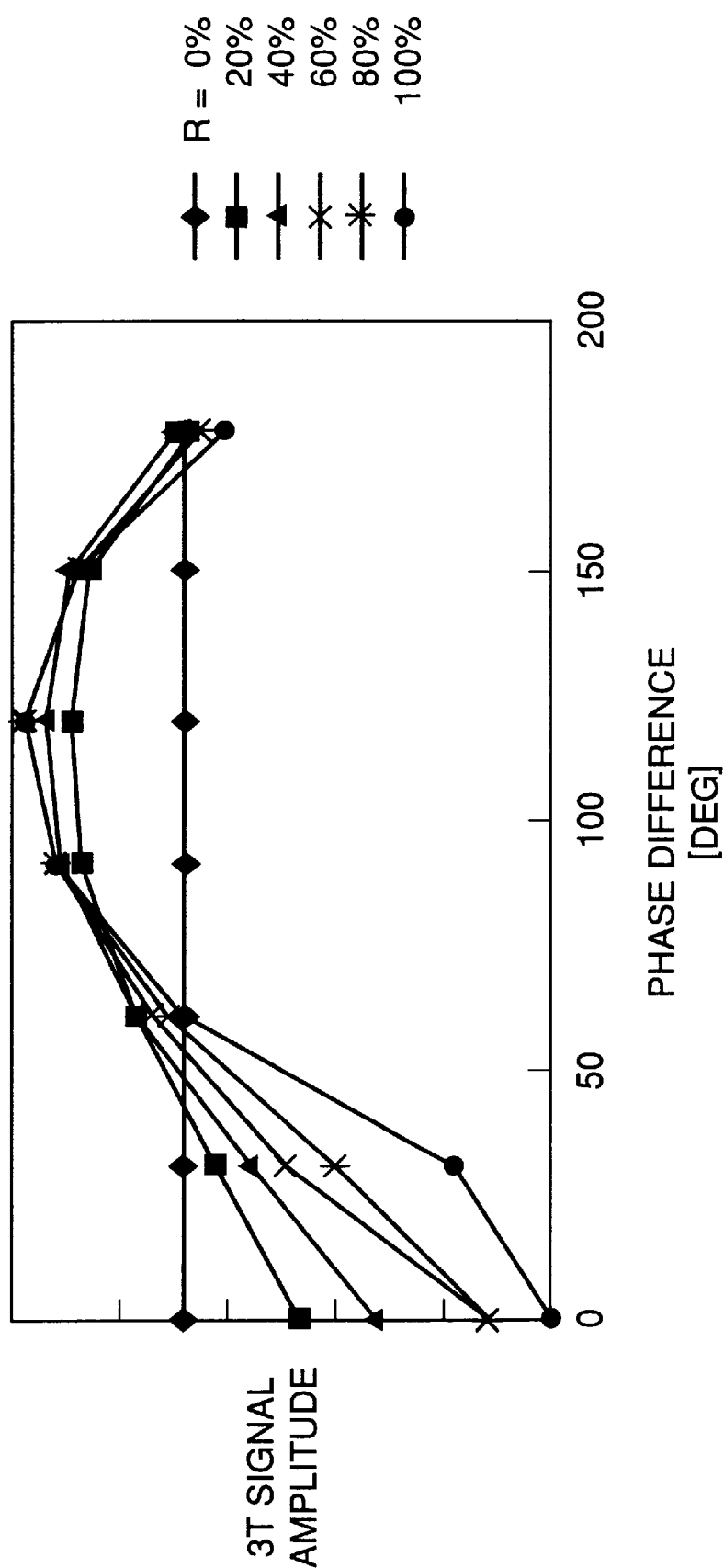
FIG. 14 is a chart for explaining a relationship between phase difference and 3T signal amplitude for the embodiment of the phase change recording medium.
Figure 15:
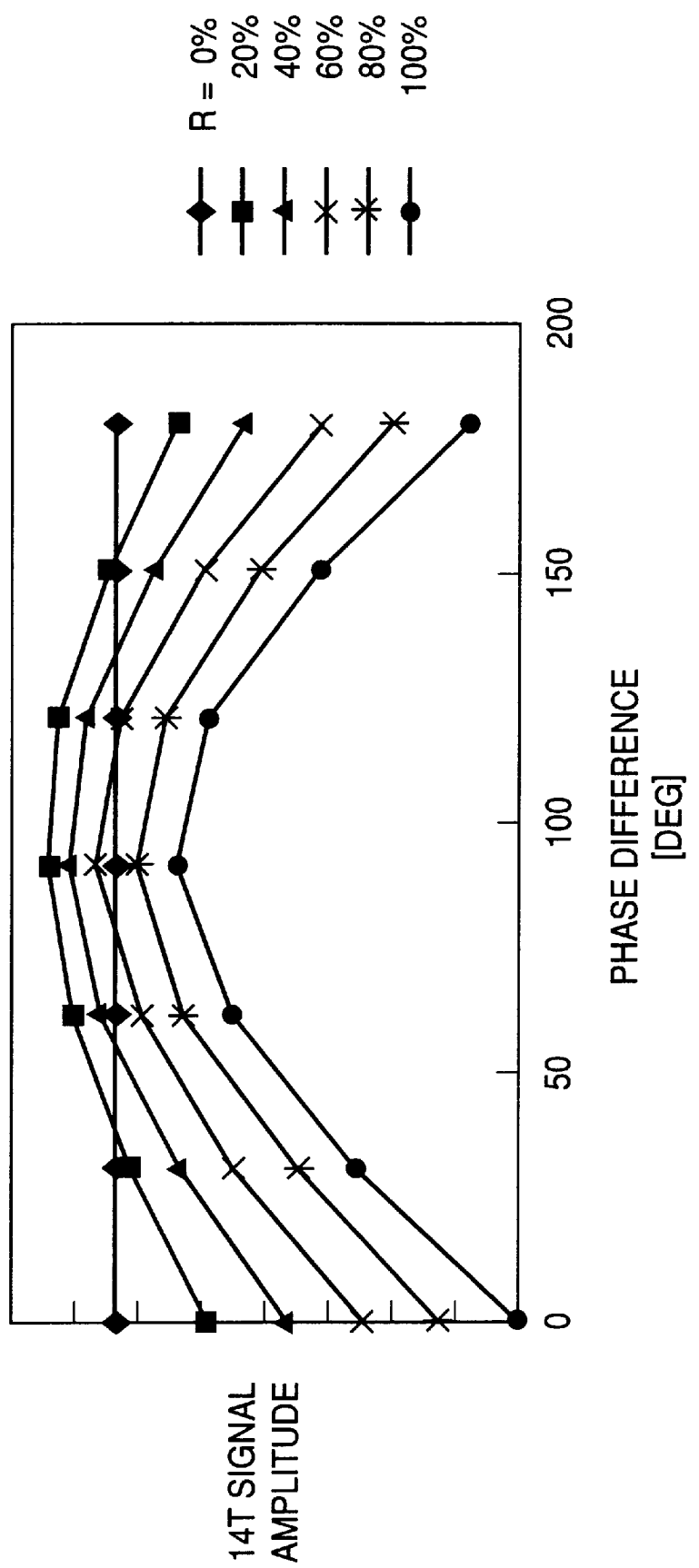
FIG. 15 is a chart for explaining a relationship between phase difference and 14T signal amplitude for the embodiment of the phase change recording medium.

FIG. 13 shows a relationship between phase difference and DPD signal sensitivity obtained as a result of measurement performed for the present embodiment of the phase change recording medium. FIG. 14 shows a relationship between phase difference and 3T signal amplitude obtained as a result of measurement performed for the embodiment of the phase change recording medium. FIG. 15 shows a relationship between phase difference and 14T signal amplitude obtained as a result of measurement performed for the embodiment of the phase change recording medium.

In FIG. 13, the optical groove depth of the grooves 59 is set at L/8 (where L is the wavelength of the laser beam), and an amplitude of a DPD signal obtained when the phase difference between the reflection beam from one of the data pits 56 and the reflection beam from one of the nonrecorded areas 57 is varied by setting the interference layer thickness at various values is indicated.

In FIG. 14, the optical groove depth of the grooves 59 is set at L/8, and an amplitude of a 3T signal obtained when the phase difference between the reflection beam from one of the data pits 56 and the reflection beam from one of the nonrecorded areas 57 is varied by setting the interference layer thickness at various values is indicated.

In FIG. 15, the optical groove depth of the grooves 59 is set at L/8, and an amplitude of a 14T signal obtained when the phase difference between the reflection beam from one of the data pits 56 and the reflection beam from one of the nonrecorded areas 57 is varied by setting the interference layer thickness at various values is indicated.

In FIGS. 13–15, "R" indicates the ratio of the reflection factor "Ra" of the data pits 56 to the reflection factor "Rc" of the nonrecorded areas 57. As shown in FIGS. 13–15, the ratio "R" is set at one of 0%, 20%, 40%, 60%, 80% and 100%, and the measurement is performed with respect to each of the cases of R=0%, 20%, 40%, 60%, 80% and 100%. For example, if the actual reflection factor of the nonrecorded areas 57 is equal to 20% and the ratio "R" is set at 50%, then the actual reflection factor of the data pits 56 is equal to 10% (=20%×50%).

In FIG. 14, the 3T signal amplitude indicates an amplitude of a signal generated in response to a reflection beam from a shortest one of the data pits 56 of the phase change recording medium 51. The larger the 3T signal amplitude, the larger the sensitivity of the optical disk apparatus for the shortest data pit 56 of the recording medium 51 is.

In FIG. 15, the 14T signal amplitude indicates an amplitude of a signal generated in response to a reflection beam from a longest one of the data pits 56 of the phase change recording medium 51. It is required that the 14T signal has a given level of amplitude.

As shown in FIG. 13, it is found that the DPD signal sensitivity is maximum when the phase difference is set at 90 degrees, and that the DPD-signal sensitivity is increased in accordance with the increase of the ratio "R".

As shown in FIG. 14, it is found that the 3T signal amplitude is maximum when the phase difference is set at about 120 degrees, and that the 3T signal amplitude varies regardless of whether the ratio "R" increases.

As shown in FIG. 15, it is found that the 14T signal amplitude is maximum when the phase difference is set at about 90 degrees, and that the 14T signal amplitude is relatively large when the ratio "R" is in a range between 0% and 60%.

Accordingly, in the phase change recording medium 51 of the present embodiment, the interference layer 53d of the recording layer 53 is configured to have a thickness such that the phase difference between the reflection beam from one of the data pits 56 and the reflection beam from one of the nonrecorded areas 57 ranges from 90 degrees to 120 degrees. When the phase change recording medium 51 has the above-mentioned configuration, it is possible to provide an adequate level of signal intensity for all the DPD signal sensitivity, the 3T signal amplitude and the 14T signal amplitude even if the phase difference between the reflection beam from one of the lands 58 and the reflection beam from one of the grooves 59 is set at 90 degrees.

In other words, when a sum of the phase difference between the reflection beam from one of the lands 58 and the reflection beam from one of the grooves 59 and the phase difference between the reflection beam from one of the data pits 56 and the reflection beam from one of the nonrecorded areas 57 ranges from 180 degrees to 210 degrees, the phase-change recording medium 51 enables the optical disk player apparatus to effectively perform the tracking servo control based on the DPD tracking method as well as enables the optical disk player/recorder apparatus to effectively perform the tracking servo control based on the push-pull method.

The phase difference between the reflection beam from one of the lands 58 and the reflection beam from one of the grooves 59 is closely related with the phase difference between the reflection beam from one of the data pits 56 and the reflection beam from one of the nonrecorded areas 57. When the optical groove depth is varied, it is desired to configure the phase change recording medium 51 such that the sum of both the phase differences ranges from 180 degrees to 210 degrees.

Further, in order to provide an adequate level of signal intensity for the tracking servo control, it is desired to make the ratio "R" of the reflection factor "Ra" to the reflection factor "Rc" related to the phase change recording medium 51 as large as possible. In the example of FIG. 13, the DPD signal sensitivity is increased in accordance with the increase of the ratio "R". In the example of FIG. 14, the 3T signal amplitude varies regardless of whether the ratio "R" increases. In the example of FIG. 15, the 14T signal amplitude is relatively large when the ratio "R" is in a range between 0% and 60%.

Accordingly, by taking account of the above-mentioned matter, in the phase change recording medium 51 of the present embodiment, the interference layer 53d of the recording layer 53 is configured to have a thickness such that the ratio "R" of the reflection factor "Ra" to the reflection factor "Rc" ranges from 40% to 60%. When the phase change recording medium 51 has the above-mentioned configuration, it is possible to provide an adequate level of signal intensity for all the DPD signal sensitivity, the 3T signal amplitude and the 14T signal amplitude while making the ratio "R" as large as possible.

In the above-described embodiment, the erasable phase change recording medium enables the optical disk player apparatus to effectively perform the tracking servo control based on the DPD tracking method as well as enables the optical disk player/recorder apparatus to effectively perform the tracking servo control based on the push-pull method.

Figure 16:
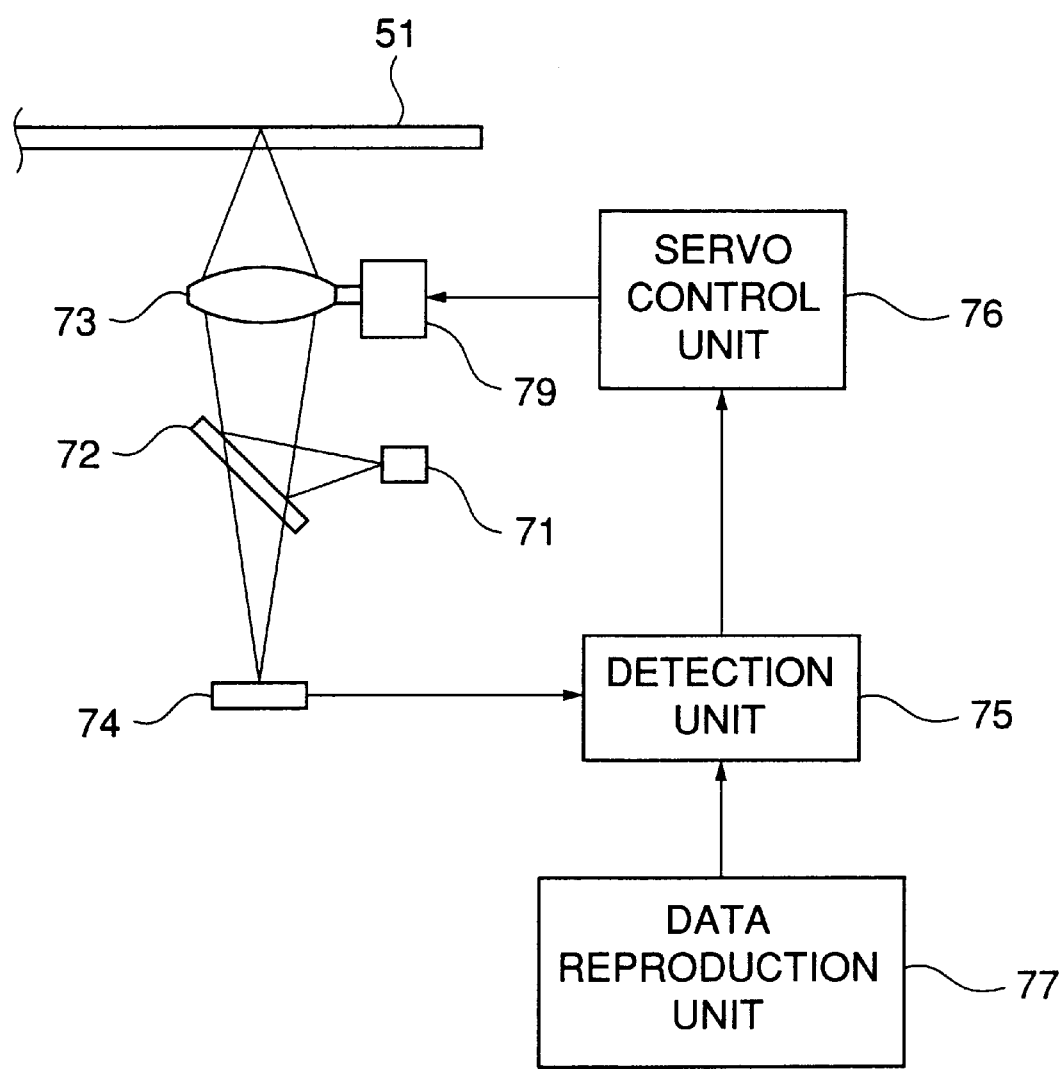
FIG. 16 is a diagram for explaining a construction of an optical disk apparatus which accesses the embodiment of the phase change recording medium.

FIG. 16 shows a construction of an optical disk apparatus which accesses the phase change recording medium 51 of the present embodiment.

As shown in FIG. 16, in the optical disk apparatus, a laser light source 71 is provided to emit a laser beam. A half mirror 72 is provided to reflect the laser beam from the laser light source 71 to the phase change recording medium 51. The half mirror 72 passes through a reflection beam from the phase change recording medium 51 to a photodetector 74. An objective lens 73 converts the laser beam from the half mirror 72 into a converging beam so that the converging beam forms a light spot on the phase change recording medium 51.

A reflection beam from the phase change recording medium 51 is converted into a converging beam by the objective lens 73, and the converging beam passes through the half mirror 72 to the photodetector 74. The photodetector 74 is provided to convert the reflection beam from the phase change recording medium 51 into an electric signal. The signal output from the photodetector 74 is supplied to a detection unit 75. The detection unit 75 is provided to output a servo control signal (such as a tracking error signal or a focusing error signal) based on the signal from the photodetector 74. Also, the detection unit 75 is provided to output a playback signal based on the signal from the photodetector 74.

The servo signal output from the detection unit 75 is supplied to a servo control unit 76. The servo control unit 76 is provided to output a control signal based on the servo signal from the detection unit 75. The control signal output from the servo control unit 76 is supplied to a servo mechanism 79. The servo mechanism 79 includes a tracking motor (or a tracking coil) and a focusing coil which are provided to carry out a tracking servo control and a focusing control. The tracking motor and the focusing coil in the servo mechanism 79 are controlled in accordance with the control signal from the servo control unit 76. Also, the playback signal output from the detection unit 75 is supplied to a data reproduction unit 77. The data reproduction unit 77 is provided to reproduce data based on the playback signal from the detection unit 75.

In the optical disk apparatus of FIG. 16, the laser beam emitted by the laser light source 71 is reflected to the phase change recording medium 51 by the half mirror 72. The objective lens 73 converts the laser beam from the half mirror 72 into a converging beam so that the converging beam forms the light spot on the recording layer 53 of the phase change recording medium 51.

The reflection beam from the phase change recording medium 51 is converted into a converging beam by the objective lens 73, and the converging beam from the objective lens 73 passes through the half mirror 72. The photodetector 74 converts the reflection beam into an electric signal. The signal output from the photodetector 74 is supplied to the detection unit 75. The detection unit 75 outputs a servo control signal to the servo control unit 76 based on the signal from the photodetector 74. Also, the detection unit 75 outputs a playback signal to the data reproduction unit 77 based on the signal from the photodetector 74.

Figure 7:
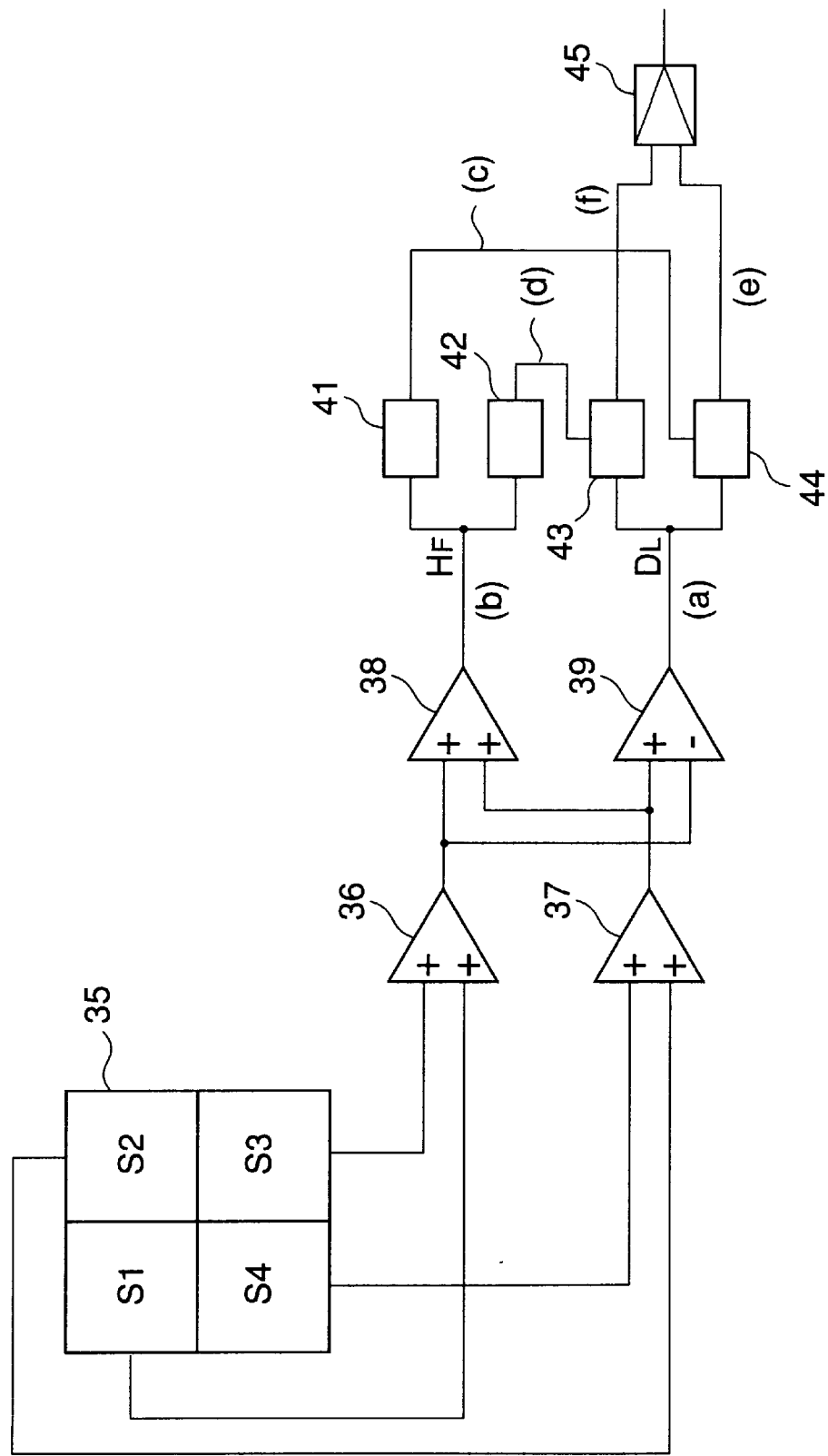
FIG. 7 is a diagram of a conventional tracking control circuit of an optical disk player apparatus.
Figure 8:
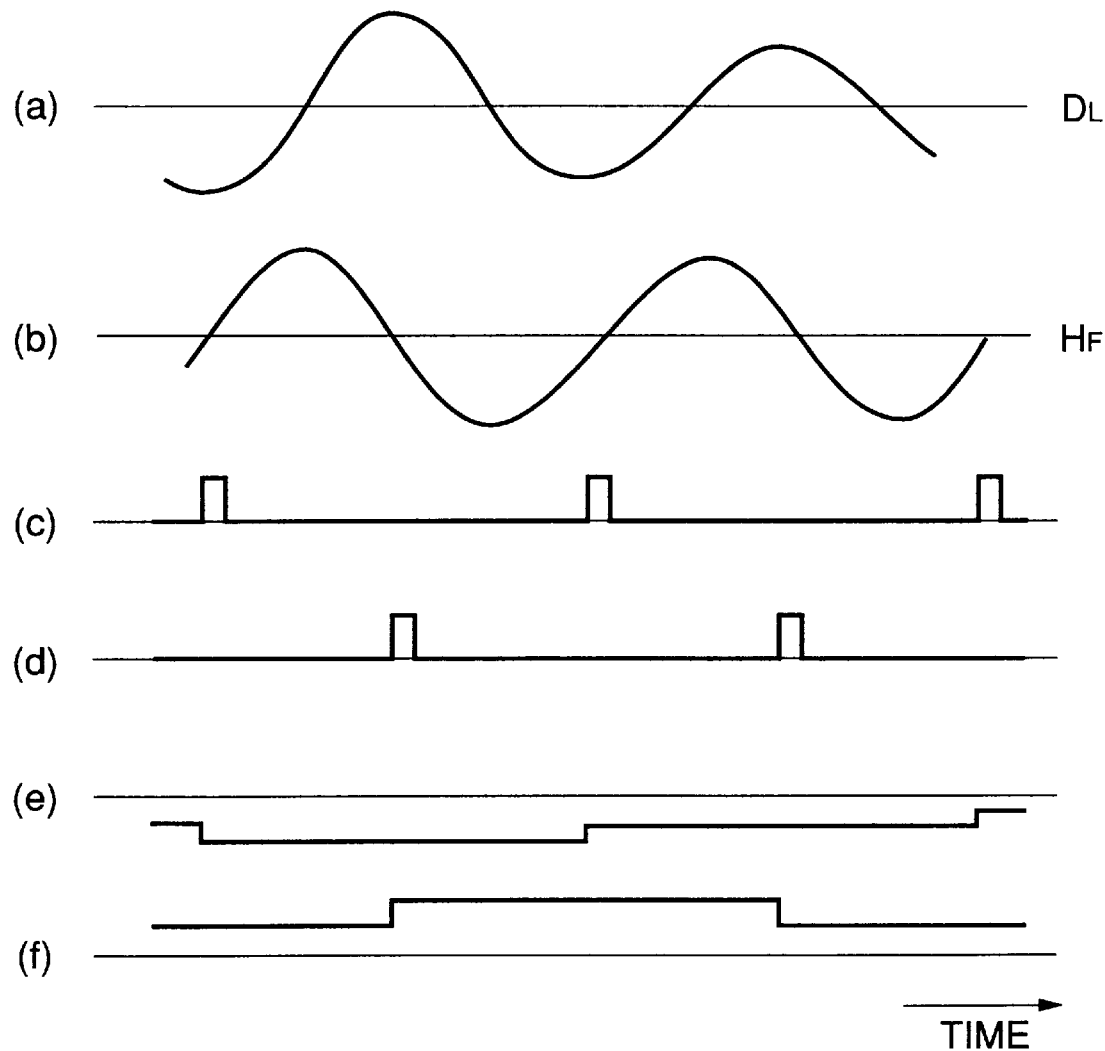
FIG. 8 is a time chart for explaining an operation of the conventional tracking control circuit of FIG. 7.

In a case in which the optical disk apparatus of FIG. 16 is an optical disk player apparatus adapted only to reproduce data from the phase change recording medium 51, the photodetector 74 is divided into four photodiodes which are similar to the corresponding elements of the photodetector 35 of the tracking control circuit of FIG. 7. Similar to the tracking control circuit of FIG. 7, the detection unit 75 outputs the DPD signal (or the tracking control signal) to the servo control unit 76 based on the difference signal "D1" indicating the difference between the sum signal (S2+S4) from two of the four photodiodes and the sum signal (S1+S3) from the other photodiodes. The phase change recording medium 51 enables the optical disk apparatus of FIG. 16 to reproduce data from the phase change recording medium 51 through the tracking servo control based on the DPD method.

In a case in which the optical disk apparatus of FIG. 16 is an optical disk player/recorder apparatus adapted to record data to and reproduce data from the phase change recording medium 51, the photodetector 74 is divided into two photodiodes which are similar to the corresponding elements of the photodetector 16 of the optical disk apparatus of FIG. 6. Similar to the optical disk apparatus of FIG. 6, the detection unit 75 outputs the tracking error signal based on signals output from the photodiodes of the photodetector 74, to the servo control unit 76. The phase change recording medium 51 enables the optical disk apparatus of FIG. 16 to reproduce data from the phase change recording medium 51 through the tracking servo control based on the push-pull method.

In the phase change recording medium 51 of the present embodiment, the interference layer 53d of the recording layer 53 is configured to have a thickness such that a ratio of a reflection factor of the data pits 56 to a reflection factor of the nonrecorded areas 57 ranges from 40% to 60%. Therefore, the phase change recording medium 51 enables the optical disk apparatus of FIG. 16 to properly reproduce data from the phase change recording medium 51 through the tracking servo control based on the DPD method. Further, the grooves 59 of the recording layer 53 are configured to have a groove depth such that a phase difference between a reflection beam from one of the lands 58 and a reflection beam from one of the grooves 59 is set at 90 degrees. Therefore, the phase change recording medium 51 enables the optical disk apparatus of FIG. 16 to reproduce data from the phase change recording medium 51 through the tracking servo control based on the push-pull method.

The servo control unit 76 outputs a control signal based on the related servo signal (one of the DPD signal and the tracking error signal) from the detection unit 75. The control signal output from the servo control unit 76 is supplied to the servo mechanism 79. The servo mechanism 79 carries out the tracking servo control and the focusing control in accordance with the control signal from the servo control unit 76.

Further, the present invention is not limited to the above-described embodiments, and variations and modifications may be made without departing from the scope of the present invention.

What is claimed is:

1. An erasable phase change recording medium for allowing an optical disk player to reproduce data from the recording medium through a tracking servo control based on a differential phase detection method, comprising:
   a transparent substrate;
   a recording layer of a phase change material provided on the substrate; and
   a protection layer provided to protect the recording layer on the substrate,
   wherein tracks are formed with alternate grooves and lands on the substrate of the recording medium and data is recorded to at least one of the grooves and the lands, the recording medium being configured to have a track pitch between 0.6 μm and 0.8 μm and a groove depth between 0.11.L and 0.18.L where L is a wavelength of a laser beam, said wavelength being 640 nm.

2. The phase change recording medium according to claim 1, wherein data is recorded to only the grooves in the recording medium, and the recording medium is configured to have a groove width between 0.4 μm and 0.5 μm.

3. The phase change recording medium according to claim 2, wherein the recording medium is configured to have a track pitch of 0.74 μm.

4. The phase change recording medium according to claim 2, wherein the recording medium is configured to have a groove depth of 0.145.L.

5. The phase change recording medium according to claim 1, wherein the recording medium is configured such that dummy data is recorded to an extra track outside a final track of the recording medium.

6. The phase change recording medium according to claim 1, wherein data is recorded to both the grooves and the lands in the recording medium, and the recording medium is configured to have a groove width between 0.5 μm and 0.8 μm.

7. The phase change recording medium according to claim 6, wherein the recording medium is configured to have a track pitch of 0.74 μm.

8. The phase change recording medium according to claim 6, wherein the recording medium is configured to have a groove depth of 0.145.L.

9. An erasable phase change recording medium for allowing an optical disk player to reproduce data from the recording medium through a tracking servo control based on a differential phase detection method, comprising:
   a transparent substrate;
   a recording layer of a phase change material provided on the substrate wherein a first phase providing a large reflection factor and a second phase providing a small reflection factor are formed by changing a crystal phase of the recording layer by laser beam irradiation; and
   a protection layer provided to protect the recording layer on the substrate,
   wherein data pits are provided on the recording layer by changing the crystal phase of the recording layer to the second phase, and nonrecorded areas are provided on the recording layer by maintaining the crystal phase of the recording layer in the first phase,
   wherein the recording medium is configured to have:
   a reflectance of the first phase of the recording layer ranging from 15% to 40%;
   a ratio of a reflectance of the second phase of the recording layer to the reflectance of the first phase ranging from 0% to 40%;
   a track pitch ranging from 0.40 μm to 0.84 μm; and
   a ratio of a width of one of the data pits to a width of a half diameter of a light spot on the recording medium ranging from 70% to 120%.

10. The phase change recording medium according to claim 9, wherein tracks are formed with alternate grooves and lands on the substrate of the recording medium and the data pits are recorded to both the grooves and the lands.

11. The phase change recording medium according to claim 9, wherein tracks are formed with alternate grooves and lands on the substrate of the recording medium and the data pits are recorded to only one of the grooves and the lands.

12. The phase change recording medium according to claim 9, wherein the data pits are arranged on the recording layer in one of a spiral pattern, a coaxial pattern, and a parallel pattern.

13. An erasable phase change recording medium for allowing an optical disk player to reproduce data from the recording medium through a tracking servo control based on a differential phase detection method, comprising:

a transparent substrate;

a recording layer of a phase change material provided on the substrate wherein a first phase providing a large reflection factor and a second phase providing a small reflection factor are formed by changing a crystal phase of the recording layer by laser beam irradiation; and a protection layer provided to protect the recording layer on the substrate, wherein tracks are formed with alternate grooves and lands on the substrate of the recording medium, data pits are provided on the recording layer by changing the crystal phase of the recording layer to the second phase, and nonrecorded areas are provided on the recording layer by maintaining the crystal phase of the recording layer in the first phase, wherein an interference layer is provided between the substrate and the recording layer, the interference layer being configured to have a thickness such that a phase difference between a reflection beam from one of the data pits and a reflection beam from one of the nonrecorded areas ranges from 90 degrees to 120 degrees.

14. The phase change recording medium according to claim 13, wherein the interference layer is configured to have a thickness such that a ratio of a reflection factor of the data pits to a reflection factor of the nonrecorded areas ranges from 40% to 60%.

15. The phase change recording medium according to claim 13, wherein the grooves are configured to have a groove depth such that a phase difference between a reflection beam from one of the lands and a reflection beam from one of the grooves is set at 90 degrees.

16. The phase change recording medium according to claim 14, wherein the grooves are configured to have a groove depth such that a phase difference between a reflection beam from one of the lands and a reflection beam from one of the grooves is set at 90 degrees.

17. The phase change recording medium according to claim 13, wherein the data pits are arranged on the recording layer in a spiral pattern.

* * * * *